(12) United States Patent
Yabe et al.

(10) Patent No.: US 6,955,468 B2
(45) Date of Patent: Oct. 18, 2005

(54) LINEAR-MOTION DEVICE AND BALL SCREW

(75) Inventors: Toshikazu Yabe, Kanagawa (JP); Soichiro Kato, Gunma (JP); Hiroki Yamaguchi, Saitama (JP); Tatsunobu Momono, Kanagawa (JP); Juntaro Sahara, Kanagawa (JP); Hirotoshi Aramaki, Kanagawa (JP)

(73) Assignee: NSK.Ltd., Tokyo (JP)

(*) Notice: Subject to any disclaimer, the term of this patent is extended or adjusted under 35 U.S.C. 154(b) by 65 days.

(21) Appl. No.: 10/290,211

(22) Filed: Nov. 8, 2002

(65) Prior Publication Data

US 2003/0128901 A1 Jul. 10, 2003

(30) Foreign Application Priority Data

| Nov. 8, 2001 | (JP) | P. 2001-343007 |
| Dec. 21, 2001 | (JP) | P. 2001-389586 |
| Dec. 26, 2001 | (JP) | P. 2001-395201 |
| Apr. 5, 2002 | (JP) | P. 2002-104103 |

(51) Int. Cl.⁷ .......................... F16C 29/06; F16H 25/22
(52) U.S. Cl. ..................... 384/45; 384/520; 74/424.88; 74/424.86
(58) Field of Search .......... 74/424.86, 424.76, 74/424.88, 89.42, 424.71; 384/45, 51, 520

(56) References Cited

U.S. PATENT DOCUMENTS

| 3,730,016 A | * | 5/1973 | Miller ...................... 74/424.94 |
| 4,215,032 A | * | 7/1980 | Kobayashi et al. ......... 524/377 |
| 4,983,660 A | * | 1/1991 | Yoshida et al. ............. 524/369 |
| 5,337,627 A | * | 8/1994 | Nakamura ................ 74/424.76 |
| 5,615,955 A | * | 4/1997 | Namimatsu et al. .......... 384/13 |
| 5,749,265 A | * | 5/1998 | Namimatsu et al. ...... 74/424.75 |
| 6,082,209 A | * | 7/2000 | Yabe et al. .............. 74/424.83 |
| 6,082,210 A | * | 7/2000 | Ise .......................... 74/424.83 |
| 6,095,009 A | * | 8/2000 | Takagi ..................... 74/424.88 |
| 6,149,307 A | * | 11/2000 | Kamimura et al. ........... 384/49 |
| 6,176,149 B1 | * | 1/2001 | Misu .......................... 384/45 |

FOREIGN PATENT DOCUMENTS

| JP | 57-38829 B2 | 8/1982 |
| JP | 5-27729 Y2 | 7/1993 |
| JP | 6-69502 U | 9/1994 |
| JP | 2832943 B2 | 10/1998 |
| JP | 2000-39052 A | 2/2000 |

OTHER PUBLICATIONS

MatWeb Material Property Data (www.matweb.com), Copyright 1996–2004 by Automation Creations, Inc., pp. 1–7.*

* cited by examiner

Primary Examiner—Thomas R. Hannon
(74) Attorney, Agent, or Firm—Sughrue Mion, PLLC

(57) ABSTRACT

A linear-motion device has: a linear-motion element fitted on a shaft which moves straight along the shaft; a plurality of balls which are retained in a ball groove formed on the inner side of the linear-motion element and roll over between the ball groove and the shaft; a separator interposed between the balls; and, a circulating path formed in the linear-motion element through which the balls are circulated from one end of the ball groove to the other, which is filled with a grease, wherein the separator is a formed product comprising as a resin component a polybutylene naphthalate-based elastomer formed by a hard segment made of a polybutylene naphthalate and a soft segment made of a polycondensate of 2,6-naphthalanedicarboxylic acid with a polytetramethylene ether glycol.

18 Claims, 18 Drawing Sheets

LINEAR-MOTION DEVICE AND BALL SCREW

BACKGROUND OF THE INVENTION

1. Field of the Invention

The present invention relates to a linear-motion device such as linear guide device and ball screw to be incorporated in industrial machines, etc. and more particularly to a technique for reducing noise in and prolonging the life of such a linear-motion device.

The present invention relates to a ball screw which has balls to be circulated endlessly in a return tube process and more particularly to a low noise ball screw which is preferably used in machine tools, industrial robots, etc.

In particular, the present invention relates to a ball screw which is preferably used in high speed precision positioning in machine tool bonder, etc.

2. Discussion of Related Arts

As shown in FIG. 1, a linear guide device 10 comprises a guide rail 1 having a rolling groove 3 provided on the outer surface thereof and a slider 2 mounted across the guide rail 1. The side of the slider 2 facing the rolling groove 3 of the guide rail 1 is partly opened to form a ball circulating path 4 in the form of racing track with the rolling groove 3 of the guide rail 1. Into the ball circulating path 4 are received rollably a large number of balls B.

Alternatively, as shown in FIG. 2, a ball screw device 20 comprises a ball nut 12 provided surrounding a screw shaft 11, and a plurality of balls B rollably disposed in the space defined by a thread groove 12a formed spirally on the inner surface of the ball nut 12 and a thread groove 11a formed spirally on the outer surface of the screw shaft 11 opposed to the thread groove 12a. The ball nut 12 has a ball tube 13 having an external shape of U mounted with its both ends extending to the thread groove 11a of the screw shaft 11. The balls B make a repeated circulation. In some detail, the balls B run around the screw shaft 11 plural times inside the ball nut 12. The balls B are then caught by one end of the ball tube 13 from which they then pass through the ball circulating path 18. The balls B are then returned to the thread groove 11a of the screw shaft 11 from the other end of the ball tube 13.

The linear guide device 10 and the ball screw 20 each normally have a separator provided interposed between the balls B to eliminate sound developed by the collision of balls during driving. FIG. 3 is an enlarged view of the interior of the ball circulating path 4 of the linear guide device 10 illustrating a series of balls B with a separator 100 provided interposed therebetween. The separator 100 has a concave surface 101 having an arc section corresponding to the outer surface of the ball B. The ball B is rollably retained on the concave surface 101 during circulation through the ball circulating path 4.

The separator 100 is a formed product of resin composition which is unreinforced or comprises a proper reinforcing material incorporated therein. As such a resin there is normally used a polyamide resin such as nylon 66.

However, a polyamide resin is a hard plastic having a high rigidity. Thus, the separator 100 made of such a polyamide resin undergoes a small deformation due to collision with the ball B during the operation of the linear-motion device. Therefore, the separator 100 exhibits an insufficient sound absorbing quality and cannot deform sufficiently when passing through the curved ball circulating path 4 together with the balls B, causing the deterioration of operating characteristics. Actually, frictional force momentarily rises during operation, making it impossible to obtain good operating characteristics invariably.

The recent trend is for more polyester-based elastomers comprising as a hard segment a polybutylene terephthalate (PBT) to be used Taking into account ease of assembly or sound absorbing quality.

The polyester-based elastomer comprising PBT as a hard segment exhibits a lower water absorption than polyamide and hence an excellent dimensional stability and has an excellent assembly and sound absorbing quality but is disadvantageous in that it has a deteriorated resistance to grease to be filled into the device for lubrication. Therefore, the separator 100 swells outward with time. At the same time, the position on the concave surface 101 in contact with the ball B deviates toward the center of the concave surface 101, causing the gap between the ball B and the separator 100 to increase gradually and hence raising the noise level. In some cases, as shown in FIG. 4, the separator 100 may fall outside the ball. The separator 100 which has thus fallen can prevent the ball B from circulating, making it impossible to drive the device.

On the other hand, in general, a ball screw is disadvantageous in that balls can difficultly move smoothly through a path defined by the thread groove of the screw shaft and the thread groove of the nut (hereinafter referred to as "ball rolling path") and a return tube.

In particular, when the balls are caught by the return tube from the ball rolling path, there is a tendency that the balls can difficultly move smoothly at the border of the opening at the end of the return tube (i.e., ball catching point) with the ball rolling path (hereinafter referred to as "ball catch starting point").

When the movement of the balls cannot be effected smoothly at the ball catch starting point, slight vibration occurs as the balls pass through the ball catch starting point (hereinafter referred to as "vibration due to passage of balls"), preventing the balls from circulating fairly and hence deteriorating the precision in feeding. This also causes the occurrence of noise.

In order to solve these problems, various ball screws designed to allow the balls to pass through the ball catch starting point smoothly have been proposed.

For example, Japanese Utility Model Publication No. 05-27729 discloses a ball screw having the both ends of a return tube disposed in the direction of lead angle.

A ball screw having the both ends of a return tube disposed in the direction tangential to the ball track has heretofore been known. A ball screw having the both ends of a return tube disposed in both the direction tangential to the ball track and the direction of lead angle is disclosed in Japanese Utility Model Laid-Open No. 06-69502.

Further, Japanese Patent No. 2832943 discloses a ball screw comprising a thread groove on the nut the lead angle of which gradually changes so that the pilot pressure on the balls gradually decreases toward the ball catch starting point and is released at the ball catch starting point in the ball rolling path in the vicinity of the ball catch starting point.

Moreover, Japanese Patent Publication No. 57-38829 discloses a ball screw comprising a thread groove on the nut the diameter of which gradually increases so that the constraint on the balls is gradually released toward the ball catch starting point and is completely released at the ball catch starting point in the ball rolling path in the vicinity of the ball catch starting point.

However, the aforementioned four examples contemplate smooth movement of balls only at a part of the portion where the balls move and thus cannot be a complete solution to the aforementioned problems. These approaches leave something to be desired particularly with ball screws which are used at a high feed rate or high rotary speed.

In other words, the ball screws disclosed in Japanese Utility Model Publication No. 05-27729 and Japanese Utility Model Laid-Open No. 06-69502 allow the ball's to move smoothly through the return tube but give no consideration to the movement of the balls through the ball rolling path.

Further, the ball screws disclosed in Japanese Patent No. 2832943 and Japanese Patent Publication No. 57-38829 allow the balls to move smoothly through the ball rolling path (nut side) as opposed to the aforementioned approaches but give no give no consideration to the movement of the balls through the return tube. Accordingly, when there is a difference between the direction of movement of balls through the ball rolling path and the direction of the end of the return tube, the halls collide with the inner wall of the return tube the moment the balls move from the ball rolling path to the return tube, making it difficult for the balls to move smoothly.

Moreover, since the return tube normally has a portion which is curved substantially at the right angle, it is likely that the balls can be prevented from moving smoothly at the bent portion.

In addition to this, a ball screw comprises a screw shaft and a plurality of balls disposed on a spiral track formed between the screw shaft and a nut in which the screw shaft is disposed and is adapted to transmit power between the screw shaft and the nut with the rolling and circulation of the balls. A spiral groove is provided both on the outer surface of the screw shaft and the inner surface of the nut.

The diameter of the balls depends on the diameter and lead (distance of movement of the nut per rotation of the screw shaft) of the screw shaft. The size of the balls is increased depending on the lead of the screw shaft to obtain a sufficient nominal dynamic load.

Heretofore, the ratio of the ball diameter to the radius of curvature of section of groove (hereinafter also referred to as "radius of curvature of groove") has been predetermined taking into account the value concerning rolling bearings rather than the frictional characteristics of ball screw. In order to cope with competitive friction of balls due to dispersion of revolution speed of balls, it has been practiced to provide a spacer ball interposed between the balls.

Japanese Patent Laid-Open No. 2000-39052 proposes the same measure as proposed for ball bearing, i.e., predetermination of the radius of curvature of groove on the screw shaft side to be smaller than the radius of curvature of groove on the nut side for the purpose of rendering face pressure uniform to prolong the life of the screw shaft.

A precision ball screw (precision positioning ball screw) comprises a groove formed in Gothic arch. The gap in the axial direction is predetermined to be as small as about one hundredths of the ball diameter. The balls can make three-point contact even only at axial load during driving, making it possible to obtain a stable rigidity. However, much sliding heat is generated at the three contact areas during driving. This sliding head predominates in the heat generation of the entire ball screw and is a factor lowering the efficiency and life of ball screw.

In order to inhibit the heat generation in the three contact areas, it can be proposed to increase the gap in the axial direction. However, this proposal is not desirable from the stand point of precision and acoustic troubles such as generation of abnormal sound. Further, even when the ball diameter is raised somewhat to increase the nominal dynamic load, the life of the ball screw cannot be prolonged unless the friction is reduced because the life of ball screw is actually determined by surface starting point fracture due to frictional work. The radius of curvature of groove of related art precision ball screws merely follows the value concerning rolling bearings but doesn't take into account the heat generation due to three-point contact.

Problems often arise with life and heat generation involving precision in positioning due to frictional wear more than with face pressure discussed in the above cited Japanese Patent Laid-Open No. 2000-39052. The radius of curvature of groove on the nut and screw shaft sides has never been predetermined taking into account these factors.

SUMMARY OF THE INVENTION

An aim of the invention is to provide a linear-motion device having a low noise and a prolonged life provided with a separator excellent in sound absorption and assembly as well as in grease resistance.

An aim of the invention is also to provide a low noise linear-motion device which exhibits good and stable operating characteristics over an extended period of time.

It is also an aim of the invention to solve the aforementioned problems with the related art ball screw and provide a ball screw which allows balls to move smoothly through the entire portion where the balls move.

An aim of the invention is also to provide a low heat-generating high rigidity long-life ball screw which is less subject to rolling friction and generates less sliding heat due to three-point contact characteristic of precision ball screw and less friction heat due to variation of revolution speed.

In order to solvent the aforementioned problems, the invention has the following constitutions.

In attaining the above object, according to a first aspect of the present invention, there is provided a linear-motion device comprising: a linear-motion element fitted on a shaft which moves straight along the shaft; a plurality of balls which are retained in a ball groove formed on the inner side of the linear-motion element and roll over between the ball groove and the shaft; a separator interposed between the balls; and, a circulating path formed in the linear-motion element through which the balls are circulated from one end of the ball groove to the other, which is filled with a grease, wherein the separator is a formed product comprising as a resin component a polybutylene naphthalate-based elastomer formed by a hard segment made of a polybutylene naphthalate and a soft segment made of a polycondensation of 2,6-naphthalenedicarboxylic acid with a polytetramethylene ether glycol.

According to the first aspect of the present invention, the concave surface of the separator for retaining the ball may be roughened.

According to the first aspect of the present invention, the concave surface of the separator for retaining the ball may have a groove formed concentrically or spirally therein.

According to the first aspect of the present invention, the separator is pierced with a hole extending from one concave surface thereof to the other.

According to the first aspect of the present invention, the surface hardness of the separator may be from 45 to 75 on durometer D scale.

According to the first aspect of the present invention, the filling grease may be a grease comprising a mineral oil, poly α-olefin oil or alkyldiphenylether oil as a base oil.

According to a second aspect of the invention, there is provided a linear-motion device comprising: a linear-motion element fitted on a shaft which makes a relative straight movement along the shaft; a plurality of balls which are retained in a ball groove formed on the inner side of the linear-motion element and roll over between the ball groove and the shaft; a separator provided interposed between the balls; and, a circulating path formed in the linear-motion element through which the balls are circulated from one end of the ball groove to the other and which is filled with a grease, wherein the separator is a formed product made of a material having a flexural modulus of from 80 to 1,000 MPa, According to the second aspect of the present invention, the separator is made of a thermoplastic elastomer comprising as a hard segment polyamide 12, polybutylene terephthalate or polybutylene naphthalate.

According to a third aspect of the invention, there is provided a ball screw comprising a screw shaft having a spiral thread groove provided on the outer surface thereof, a nut having a thread-groove provided on the inner surface thereof opposed to the thread groove of the screw shaft and engaged with the screw shaft with a large number of balls rollably mounted on a spiral ball rolling path formed by the two thread grooves, and a ball circulating path fixed to the nut which catches the balls at one end of the ball rolling path and then feeds the balls to the other end of the ball rolling path, wherein the diameter of the thread groove of the nut gradually increases so that the constraint on the balls is gradually relaxed towards one end of the ball rolling path in the vicinity of the one end of the ball rolling path, and then the constraint on the balls is released at the one end of the ball rolling path, and/or the lead angle of the thread groove of the nut gradually changes so that the pilot pressure gradually decreases toward the one end of the ball rolling path, and then the pilot pressure is released at the one end of the ball rolling path.

According to the third aspect of the invention, the both ends of the ball circulating path are provided in at least one of the lead angle direction and the direction tangential to the ball rolling path at the both ends of the ball rolling path as viewed in the axial direction of the nut.

According to a fourth aspect of the invention, there is provided a ball screw comprising a screw shaft having a spiral thread groove provided on the outer surface thereof, a nut having a thread groove provided on the inner surface thereof opposed to the thread groove of the screw shaft and engaged with the screw shaft with a large number of balls rollably mounted on a spiral ball rolling path formed by the two thread grooves, and a ball circulating path fixed to the nut which catches the balls at one end of the ball rolling path and then feeds the balls to the other end of the ball rolling path, wherein the diameter of the thread groove of the nut gradually increases so that the constraint on the balls is gradually relaxed towards one end of the ball rolling path in the vicinity of the one end of the ball rolling path, the constraint on the balls is released at the one end of the ball rolling path, the lead angle of the thread groove of the nut gradually changes so that the pilot pressure gradually decreases toward the one end of the ball rolling path, and the pilot pressure is released at the one end of the ball rolling path, and wherein the both ends of the ball circulating path are provided in at least one of the lead angle direction and the direction tangential to the ball rolling path at the both ends of the ball rolling path as viewed in the axial direction of the nut.

The term "direction tangential to the ball rolling path as viewed in the axial direction of the nut" as used herein is meant to indicate a two-dimensional direction in a front view as viewed in the axial direction of the nut rather than a three-dimensional direction.

In this arrangement, when the balls are caught by the ball circulating path from the ball rolling path, the movement of the balls can be smoothly effected on the ball rolling path in the vicinity of the ball catch starting point and the in the vicinity of the end of the return tube. Accordingly, even when the ball screw is used at a high feed rate or high rotary speed, the balls can be fairly circulated and the ball screw can be fed with an excellent precision. Further, the vibration of the ball screw due to the passage of the balls through the ball catch starting point can be prevented.

According to the third and fourth aspects of the invention, the nut may have a flat surface parallel to the axis thereof provided on at least a part of the outer surface thereof, a pair of holes opened at the flat surface and communicating to the thread groove of the nut are provided, the ball circulating path is inserted in the holes on the flat surface at the both ends thereof so that it is fixed to the nut, and the portion of the ball circulating path disposed on the flat surface outside the pair of holes is curved.

Thus, since the ball circulating path has no portion which is bent at almost right angle, the smooth movement of the balls can be effected throughout the ball circulating path.

According to the third and fourth aspects of the invention, it may be employed that a spacer having a concave surface which makes sliding contact with a part of the surface of the balls or a spacer ball having a smaller diameter than that of the balls is provided interposed between the balls.

Thus, when a spacer or a spacer ball is provided interposed between the balls, there can occur no competition between the balls, making it possible to move the balls more smoothly. Accordingly, the balls can be fairly circulated and the ball screw can be fed with an excellent precision. Further, the vibration of the ball screw due to the passage of the balls through the ball catch starting point can be further prevented. Moreover, the movement of the balls can be more smoothly effected also in the ball circulating path, making it possible to inhibit the occurrence of vibration and noise.

According to a fifth aspect of the present invention, there is provided that a ball screw comprising a screw shaft having a spiral groove formed on the outer surface thereof, a nut having a spiral groove formed on the inner surface thereof and a plurality of balls disposed rollably in the space between the screw shaft and the nut, wherein the ratio of the diameter of ball (Da) to the pitch diameter (dm) satisfies the relationship [1] and the ratio of the pitch diameter (dm) to the diameter of the screw shaft (d) satisfies the relationship [2]:

$$0.05 < Da/dm < 0.2 \tag{1}$$

$$1.005 < dm/d < 1.06 \tag{2}$$

According to a sixth aspect of the present invention, there is provided that a ball screw comprising a screw shaft having a spiral groove formed on the outer surface thereof, a nut having a spiral groove formed on the inner surface thereof and a plurality of balls disposed rollably in the space between the screw shaft and the nut, wherein supposing that the radius of curvature of the groove of the screw shaft is Rs, the radius of curvature of the groove of the nut is Rn, the diameter of ball is Da, fn is Rn/Da and fs is Rs/Da, at least one of the following relationships is satisfied:

$$0.44 \leq (0.4(fn-fs)+0.5)/(fn+fs) \leq 0.49 \quad [3]$$

$$-0.49 \leq (0.4(fn-fs)-0.5)/(fn+fs) \leq -0.44 \quad [4]$$

According to the fifth and sixth aspects of the present invention, a cushioning material may be provided interposed between the plurality of balls.

According to the fifth and sixth aspects of the present invention, the plurality of balls each may come in contact with the groove of the screw shaft and the groove of the nut at three points.

In accordance with the aforementioned constitutions, the ratio of the diameter of ball to the pitch diameter (diameter of ball pitch circle) is not greater than 20%. Accordingly, the friction of the balls with the groove is reduced and the variation of the revolution speed is reduced, eliminating the friction of the balls. Further, since the number of balls can be increased, the rigidity of the balls can be enhanced.

By predetermining the ratio of the radius of curvature of groove to the diameter of ball to a range of from 0.51 to 0.57, the frictional force of the balls on the surface of the groove which is statically loaded makes it possible to minimize slippage occurring during driving and lessen the generation of heat due to slippage. Further, since the radius of curvature of groove is small, the desired rigidity can be secured to advantage.

In particular, by predetermining the radius of curvature of groove on the driving side smaller than the radius of curvature of groove on the driven side, friction loss can be reduced.

Further, by providing a cushioning material (spacer; separator) made of a synthetic resin or the like interposed between the balls, the collision and friction of the balls due to the variation of the revolution speed can be relaxed.

In the aforementioned arrangement, a ball screw which can be operated stably with low heat generation, low friction and high rigidity can be obtained.

The related art ball screws give no consideration to frictional characteristics of ball screw and thus are not designed to satisfy the aforementioned relationships. It has been thought that when the aforementioned relationships are satisfied, the resulting reduction of the ratio of the radius of curvature of groove to the diameter of ball causes the rise of friction by the amount of increase of the contact area, not to mention the reduction of life by the reduction of the diameter of ball.

The predetermination of the radius of curvature of groove on the screw shaft side to be smaller than the radius of curvature of groove on the nut side has been determined taking into account the uniformity of face pressure rather than the driving efficiency. There are some cases where a cushioning material is provided taking into account only the collision/friction of balls due to variation of revolution speed as a factor of friction of ball screw. However, no direct improvements in the resistance to sliding friction due to contact at three points can be expected.

The inventors made numerical analysis of friction and rigidity of ball screw involving contact at three points. As a result, it was found that as the ratio of radius of curvature of groove to ball diameter (R/Da) decreases to 0.51, the sliding friction decreases as opposed to the conventional theory (hall bearing). Further, when R/Da is small, the face pressure is lowered, increasing the load-carrying capacity and hence making it possible to cancel out the variation of revolution speed of ball and the reduction of the load-carrying capacity by the reduction of the ball diameter for the purpose of reducing the friction and prolong the abrasion life due to sliding friction. In addition, the inventors found that there is a combination of the radius R of curvature of groove on the nut side and screw shaft side suitable for normal and reverse operations. Thus, the relationships [3] and [4] were derived.

Further, referring to the effect of the close variation of revolution speed due to error in production and slight variation of contact angle, the suppression by a cushioning material piece makes it possible to increase the stability of balls as well as secure the reduction of friction on the groove surface, lessening the entire friction and its variation.

DETAILED DESCRIPTION OF THE PREFERRED EMBODIMENTS

Figure 1:
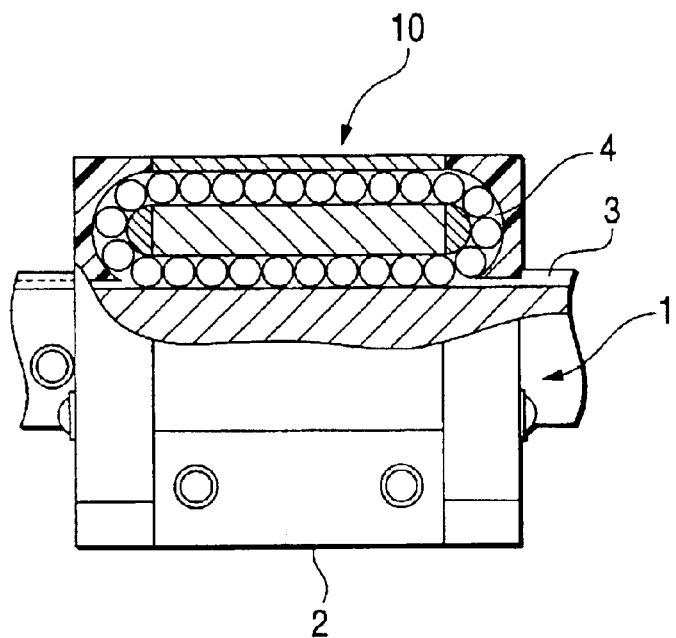
FIG. 1 is a partly cutaway front view illustrating a linear guide device as an embodiment of the linear-motion device of the invention.

The linear-motion device of the invention will be further described hereinafter.

[First and Second Embodiments]

In the invention, the linear-motion device is not specifically limited so far as it is provided with a separator. A linear guide device 10 shown in FIG. 1 and a hall screw device 20 shown in FIG. 2 may be exemplified. The separators 100 each are a formed product comprising as a resin component a polybutylene naphthalate-based elastomer described in detail later.

The polybutylene naphthalate-based elastomer has a chemical structure represented by the following chemical formula I and is formed by a polybutylene naphthalate (moiety A in the formula) which is a crystalline hard segment and a soft segment (moiety C in the formula) containing a polytetramethylene ether chain (moiety B in the formula). The soft segment is obtained by the polycondensation of 2,6-naphthalenedicarboxylic acid with polytetramethylene ether glycol.

Chemical Formula I

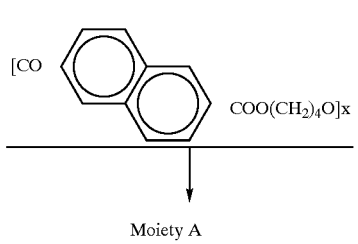

Moiety A

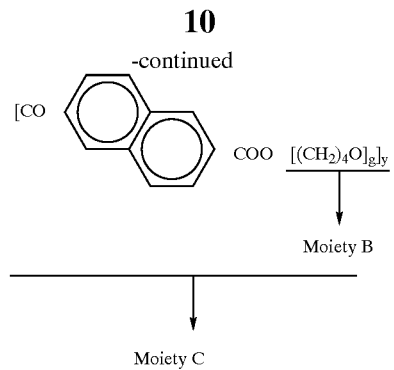

Moiety B

Moiety C

The hardness of the separator varies with the ratio of hard segment to soft segment (x:y). The greater the proportion of soft segment is, the softer is the separator and the lower is the grease resistance. In the invention, the surface hardness of the separator is preferably from 45 to 75, particularly from 50 to 65 on durometer D scale. When the surface hardness of the separator falls below 45, the resulting separator exhibits a deteriorated grease resistance and so high a elasticity as to cause the ball to oscillate easily. On the contrary, when the surface hardness of the separator exceeds 75, the resulting separator exhibits too low an elasticity to have a good sound absorbing quality and leaves something to be desired in assembly. Accordingly, taking into account the surface hardness, the suffixes a and b in the chemical formula I are properly predetermined.

The following chemical formula II represents a polyester-based elastomer comprising as a hard segment a polybutylene terephthalate which has heretofore been used in separator materials. As compared with this polyester-based elastomer, the polybutylene naphthalate-based elastomer to be used in the invention has a naphthalene ring in its structure. It is thought that this naphthalene ring enhances the grease resistance of the separator material.

Chemical formula II

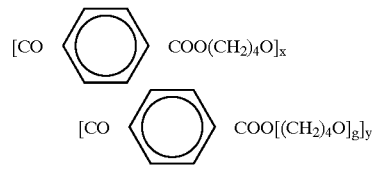

The aforementioned polybutylene naphthalate-based elastomer may comprise a reinforcing filler such as glass fiber, carbon fiber and potassium titanate whisker incorporated therein as necessary. The incorporation of such a filler in the aforementioned polybutylene naphthalate-based elastomer gives an enhancement of strength, abrasion resistance and impact resistance of separator to prevent the destruction of the separator due to collision with the balls, making it possible to reduce noise over an extended period of time. Particularly preferred among these reinforcing fillers are carbon fiber and potassium titanate whisker because they have vibration-damping properties themselves. The amount of such a filler to be incorporated is preferably from 10% to 40% by weight, particularly from 20% to 30% by weight based on the total amount of the separator. When the amount of such a filler to be incorporated falls below 10% by weight, the resulting effect of enhancing strength and other properties is insufficient. On the other contrary, when the amount of such a filler to be incorporated exceeds 40% by weight, the resulting polybutylene naphthalate-based elastomer exhibits a deteriorated formability to disadvantage.

The aforementioned polybutylene naphthalate-based elastomer may further comprise an additive for inhibiting deterioration such as oxidation inhibitor and ultraviolet-absorbing agent incorporated therein.

In order to obtain the separator of the invention, the aforementioned polybutylene naphthalate-based elastomer or a composition having a filler or additives incorporated therein as a forming material is formed into a predetermined shape preferably by injection molding method.

Figure 5:
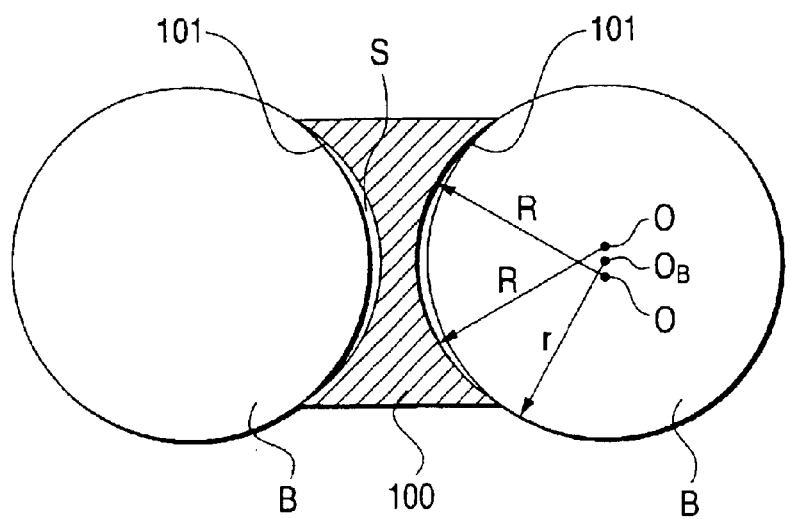
FIG. 5 is a sectional view illustrating a preferred embodiment of the separator of the invention.

FIG. 5 is a sectional view illustrating a preferred embodiment of the separator 100. The separator 100 shown has two centers O of radius of curvature R forming the concave surface 101 which each deviate from the center $O_B$ of the ball B. In this arrangement, a gap S is formed between the concave surface 101 of the separator 100 and the ball B. A grease (not shown) flows into the gap S to allow the ball B to roll over smoothly. The surface of the concave surface 101 may be flat but is preferably rough to retain the grease thereon. The degree of roughness of the concave surface 101 is preferably from 5 µm to 50 µm as calculated in terms of surface roughness $R_{max}$.

Figure 6A:
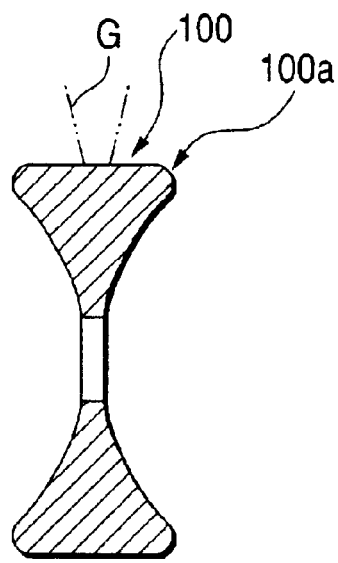
FIG. 6A is a sectional view illustrating other preferred embodiments of the separator of the invention.
Figure 6B:
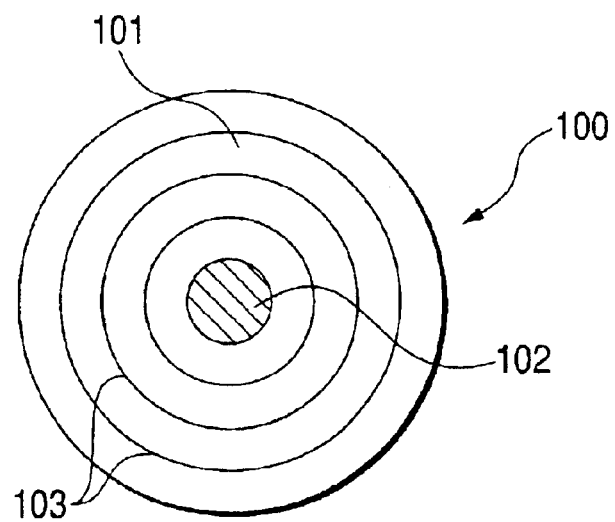
FIG. 6B is a front view illustrating other preferred embodiments of the separator of the invention.

The separator 100 may further have a concentric or spiral groove formed on the concave surface 101 thereof. The separator 100 may further be pierced with a hole so that the grease can easily flow into the gap between the concave surface 101 of the separator 100 and the ball B. For example, the separator 100 shown in FIG. 6 is pierced with a hole 102 at the central part of the concave surface 101. A plurality of grooves 103 are formed concentrically. The grease (not shown) which has flown through the hole 102 is then retained in the groove 103 to keep the ball fairly lubricated. The peripheral edge 100a of the concave surface 101 is chamfered circularly to make it more easily for the grease to flow into the gap. The diameter of the hole 102, the depth, width and number of grooves 103, etc. are not limited but may be properly predetermined depending on the size, mechanical strength, etc. of the separator 100. For example, the depth of the groove 103 is preferably from about 5 µm to 30 µm.

A plurality of combinations of the roughening of the concave surface 101, the formation of the hole 102 and the groove 103 and the chamfering of the peripheral edge 100a of the concave surface 101 may be used.

The filling grease to be used here in may be a known material but may be a grease comprising as a base oil a mineral oil, poly α-olefin oil, alkyldiphenyl ether oil or the like to further suppress the swelling of the separator 100.

The invention will be further described in the following examples and comparative examples.

(Preparation of Separator)

A polybutylene naphthalate-based elastomer ("PELFRENE EN2000" produced by Toyobo co., Ltd.) was injection-molded into a separator A (inventive) pierced with a hole and provided with a concentric groove having a depth of 30 µm as shown in FIG. 6. The separator A thus exhibited a surface hardness of 55 on durometer D scale. Separately, a related art polybutylene naphthalate-based elastomer ("PELPRENE P-150B" produced by Toyobo Co., Ltd.) was injection-molded to prepare a separator B (comparative) similarly to the separator A. The separator B thus obtained exhibited a surface hardness of 57 on durometer D scale.

(Grease Resistance Test)

The aforementioned separators A and B were each provided interposed between the balls in a linear guide device ("LH30", produced by NSK Ltd.). Alvania No. 2 grease, which is a mineral oil-lithium soap-based grease, was filled into the ball circulating path of these linear guide devices which were then sealed to prepare testing linear guide devices A (inventive) and B (comparative), respectively. The sum of all the gaps between ball and separator of the testing linear guide devices which had just been prepared was 50% of the diameter of the ball. The testing linear guide devices A and B were each then allowed to run at a feed rate of 1 m/s and a stroke of 1,000 mm. Every 500 km of running, the testing linear guide devices were each disassembled to measure the sum of the gaps. The percent change of the sum of the gaps from the initial value was then determined. The results are set forth in Table 1 below. The testing linear guide device A according to the invention showed little change of the sum of the gaps even after 3,000 km of running and no fall of separators, demonstrating that the testing linear guide device A had been kept running in a stable manner. On the contrary, the testing linear guide device B showed a great change of the sum of the gaps and was unable to run after 1,300 km of running. The testing was then suspended.

TABLE 1

Results of measurement of percent change of gaps

| Running distance (km) | 0 | 500 | 1,000 | 1,500 | 2,000 | 2,500 | 3,000 |
|---|---|---|---|---|---|---|---|
| Linear guide device A (inventive) | 50% | 52.0% | 52.5% | 52.7% | 52.8% | 52.9% | 53.0% |
| Linear guide device B (comparative) | 50% | 59% | 65% | Test suspended | Test suspended | Test suspended | Test suspended |

The gate of the injection molding machine to be used herein maybe in the form of pin. The position of the gate is preferably deviated from the concave surface 101 of the separator. For example, as shown in FIG. 6, the gate G is preferably arranged such that it faces the peripheral surface of the separator 100. Alternatively, though not shown, the gate may be arranged such that it faces the inner surface of the hole 102.

Figure 2:
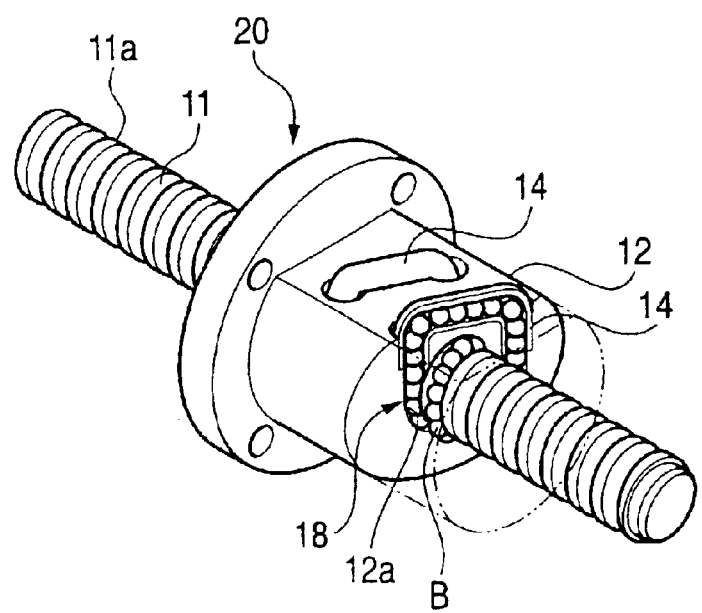
FIG. 2 is a partly cutaway perspective view illustrating a ball screw device as another embodiment of the linear-motion device of the invention.
Figure 3:
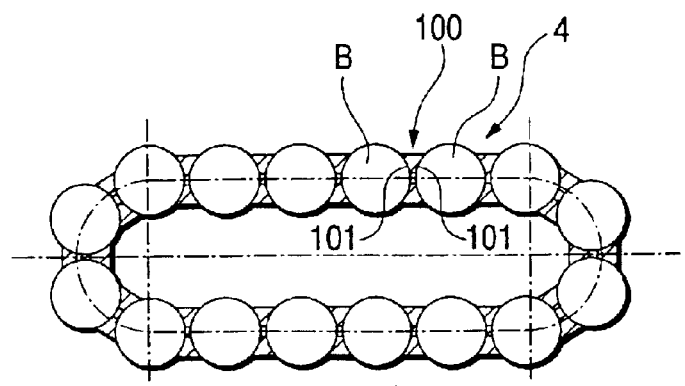
FIG. 3 is an enlarged view illustrating the interior of the ball circulating path in the linear guide device of FIG. 1.
Figure 4:
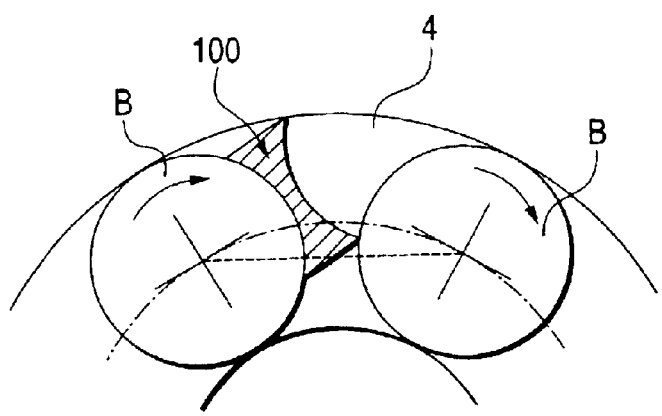
FIG. 4 is a partly enlarged view of FIG. 3 illustrating defects of a related art separator.

The aforementioned separator 100 is provided interposed between the balls B of a linear guide device 10 as shown in FIG. 1 or a ball screw device 20 as shown in FIG. 2. A lubricating grease is then sealed in the ball circulating paths 4, 18 to complete the linear-motion device of the invention.

A separator 100 having an elastic modulus of from 80 to 1,000 MPa, as a second embodiment of the present invention, is explained thereafter.

Examples of the material having an elastic modulus of from 80 to 1,000 MPa include thermoplastic elastomer, soft vinyl chloride, soft polyethylene, fluoroplastic, and synthetic rubber. Specific examples of the thermoplastic elastomer (TPE) include polyamide-based elastomer comprising polyamide (PA) 6, PA66, PA11, PA12 or the like as a hard segment, polyester-based elastomer comprising polybutylene terephthalate (PBT), polybutylene naphthalate (PBN) or the like as a hard segment, olefin-based elastomer, urethane-based elastomer, styrene-based elastomer, and nitrile rubber-based elastomer. Specific examples of the fluoroplastic include polytetrafluoroethylene (PTFE), tetrafluoroethylene-perfluoroalkyl vinyl ether copolymer (PFA), tetrafluoroethylene-hexafluoropropropylene copolymer (FEP), and ethylene-chlorotrifluoroethylene copolymer (ECTFE). Particularly preferred among these materials are PFA, FEP, and ECTFE, which can be subjected to injection molding.

Table 2 shows the flexural modulus of the various materials described above and ordinary hard plastics listed for comparison. Some of PBT-based TPE's and PBN-based TPE's exhibit a flexural modulus of greater than 1,000 MPa. PBT-based TPE's and PBN-based TPE's having a flexural modulus of not greater than 1,000 MPa attained by adjusting the mixing ratio of hard segment may be used.

Specific examples of the dicarboxylic acid which is a starting material include aromatic dicarboxylic acids such as terephthalic acid, isophthalic acid, alicyclic dicarboxylic acids such as 1,4-cyclohexanedicarboxylic acid and decalinedicarboxylic acid, and aliphatic dicarboxylic acids such as succinic acid, glutaric acid, adipic acid, azelaic acid, sebasic acid, suberic acid, dodecane dioic acid and undecane dioic acid. On the other hand, representative examples of the diamine which is a starting material include a diamine represented by the following chemical formula (2) preferably having from 3 to 30 ether bonds (oxygen) in its structure. In other words, the suffixes k and j in the chemical formula (2) are preferably from 2 to 4 and from 3 to 30, respectively.

$$H_2N-[(CH_2)_kO]_j-(CH_2)_k NH_2 \quad (2)$$

TABLE 2

Flexural modulus [MPa] of various materials

| PA12-based TPE | PA6-based TPE | PBT-based TPE | PBN-based TPE | Olefin-based TPE | PA46 | PA66 | PBT |
|---|---|---|---|---|---|---|---|
| 20 to 370 | 320 to 860 (160 to 310) | 20 to 1,260 | 50 to 1,600 | 150 to 440 | 3,140 (1,180) | 2,890 (1,520) | 2,350 |

| POM | PTFE | PFA | FEP | PCTFE | ETFE | ECTFE | PVDF |
|---|---|---|---|---|---|---|---|
| 2,210 | 500 to 600 | 660 to 820 | 550 to 650 | 1,250 to 1,790 | 900 to 1,370 | 660 to 690 | 1,400 to 2,480 |

Note 1: The figure in parenthesis indicates flexural modulus of material which has absorbed water.
Note 2: Some olefin-based TPE's have a lower flexural modulus.
Note 3: POM: polyacetate; PCTFE: polychlorotrifluoroethylene; ETFE: tetrafluoroethylene-ethylene copolymer; PVDF: polyvinylidene fluoride Particularly preferred among the aforementioned materials are PA12-based TPE, PBT-based TPE, and PBN-based TPE Taking into account oil resistance, water absorption, sound absorbing quality, etc. In particular, PA12-based PTE is most desirable because it exhibits the smallest volume change (swelling) against the grease comprising as a base oil mineral oil or ester oil which is normally used for linear-motion device.

This PA12-based TPE has a chemical structure represented by the following chemical formula (1) and comprises a PA12 structure (moiety A) which is a crystalline hard segment and a polyether structure (moiety C) which is a soft segment in its skeleton. In the chemical formula (1), the moiety B is a moiety produced by the reaction of a dicarboxylic acid which is a starting material of PA12-based TPE with a diamine having a polyether structure (moiety C). The moiety D is a moiety derived from the dicarboxylic acid. The moiety E is a moiety derived from the diamine.

As the diamine there may be used also bis-(3-aminopropyl) polytetrahydrofurane represented by the following chemical formula (3).

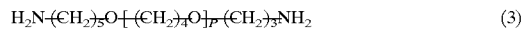

$$H_2N-(CH_2)_3O-[(CH_2)_4O]_p-(CH_2)_3NH_2 \quad (3)$$

As the PA12-based TPE to be used herein there may be used one represented by the following chemical formula (4) besides one having a moiety B derived from dicarboxylic acid and diamine represented by the chemical formula (1). In the chemical formula (4), the moiety F is made of a polyether structure and corresponds to the soft segment in the chemical formula (1). The moiety F is a moiety derived from a polyetherdiol which is a starting material. On the other hand, the moiety G is a moiety derived from, dodecane dioic acid which is a starting material and acts to connect the hard segment (PA12) to the soft segment (moiety F).

(1)

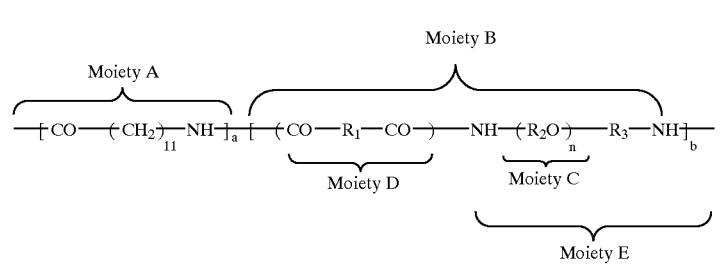

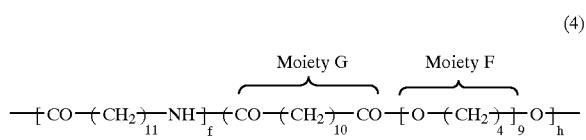

(4)

The moieties F and G may have other structures. For example, the number of carbon atoms in the Moiety F may be other than 4. The moiety G may have a dicarboxylic acid having from 4 to 36 carbon atoms as defined above instead of dodecane dioic acid.

PBT-based PTE has a chemical structure represented by the following chemical formula (5) or (6) and comprises PBT (moiety H) which is a crystalline hard segment and an aromatic polyether containing a polytetramethylene ether chain (moiety I) which is a soft segment in the chemical formula (5) or a soft segment formed by an aliphatic polyester (moiety J) in the chemical formula (6).

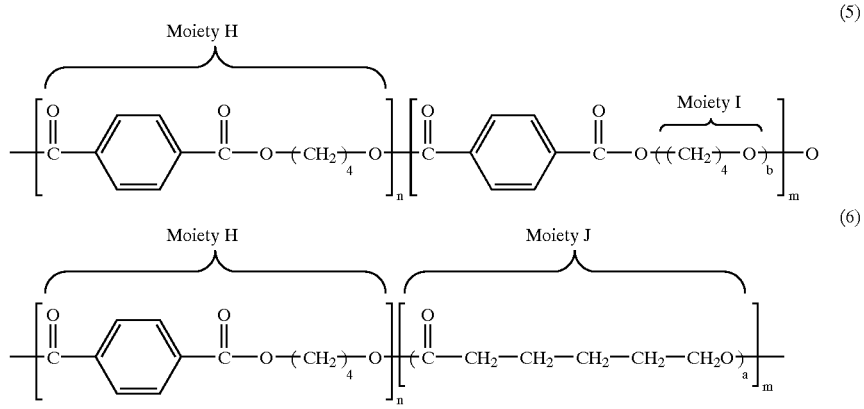

(5)

(6)

PBN-based TPE has a chemical structure represented by the following chemical formula (7) and comprises PBN (moiety K) which is a crystalline hard element and a soft segment containing a polytetramethylene ether chain (moiety I).

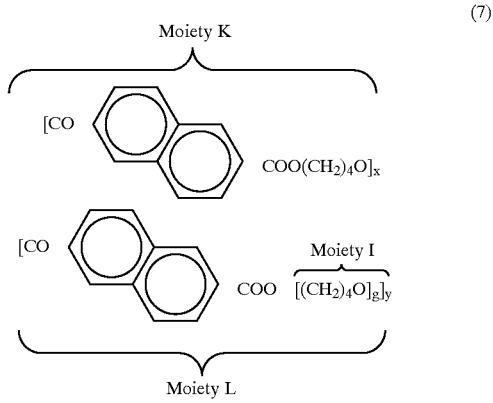

(7)

The aforementioned thermoplastic elastomer changes in its material rigidity with the proportion of hard segment and soft segment. Thus, the greater the proportion of soft segment is, the lower is the flexural modulus of the thermoplastic elastomer and hence the grease resistance (oil resistance) of the thermoplastic elastomer. In the invention, the thermoplastic elastomer having a flexural modulus of from 80 to 1,000 MPa, particularly from 100 to 300 MPa is preferably used as a separator material. When the flexural modulus of the thermoplastic elastomer falls below 80 MPa, the resulting thermoplastic elastomer exhibits too low a rigidity and poor a durability and grease resistance to be practically used. On the contrary, when the flexural modulus of the thermoplastic elastomer exceeds 1,000 MPa, the resulting thermoplastic elastomer exhibits too high a rigidity to have a desired sound absorbing quality and a deteriorated assembly.

The aforementioned thermoplastic elastomer may comprise a reinforcing filler such as glass fiber, carbon fiber and potassium titanate whisker incorporated therein so far as the flexural modulus thereof doesn't deviate from the above defined range. The incorporation of such a filler in the aforementioned thermoplastic elastomer gives an enhancement of strength, abrasion resistance and impact resistance of separator to prevent the destruction of the separator due to collision with the balls, making it possible to reduce noise over an extended period of time. Particularly preferred among these reinforcing fillers are carbon fiber and potassium titanate whisker because they have vibration-damping properties themselves. The amount of such a filler to be incorporated is preferably from 10% to 40% by weight, particularly from 20% to 30% by weight based on the total amount of the separator. When the amount of such a filler to be incorporated falls below 10% by weight, the resulting effect of enhancing strength and other properties is insufficient. On the other contrary, when the amount of such a filler to be incorporated exceeds 40% by weight, the resulting thermoplastic elastomer exhibits a deteriorated formability to disadvantage.

In the invention, a synthetic rubber, too, is preferably used as a separator material. By incorporating a filler such as carbon black and silica or other additives in the synthetic rubber, the flexural modulus of the synthetic rubber is adjusted to a range of from 80 to 1,000 MPa. The kind of the rubber is preferably acrylonitrile butadiene rubber (NBR), fluororubber (FKM) or the like taking into account oil resistance.

The aforementioned various separator materials may each comprise additives for inhibiting deterioration such as oxidation inhibitor and ultraviolet absorber incorporated therein.

In order to obtain the separator of the invention, a composition comprising the aforementioned thermoplastic elastomer, soft vinyl chloride resin, soft polyethylene, fluoroplastic, synthetic rubber and optionally a filler or additives is formed into a predetermined shape preferably by injection molding method.

The separator of the invention may be also cylindrical, though not shown. The shape of the concave surface of the separator may be an arch having a radius of curvature approximated to the radius of the ball or a cone instead of the aforementioned Gothic arch.

The aforementioned separator 100 is disposed interposed between the balls B in a linear guide device 10 as shown in FIG. 1 or a ball screw device 20 as shown in FIG. 2. A lubricating grease is then sealed in the ball circulating paths 4, 18 to complete the linear-motion device of the invention.

The filling grease to be used herein may be a known material but may be a grease comprising as a base oil a mineral oil, poly α-olefin oil, alkyldiphenyl ether oil or the like to further suppress the swelling of the separator 100.

EXAMPLE

The invention will be further described in the following examples and comparative examples.
(Preparation of Separator)

Various materials set forth in Table 3 were each subjected to injection molding by an injection molding machine to prepare separators having a through-hole and a concentric groove having a depth of 30 μm as shown in FIG. 6.

used. In Example 3, Diamide-PAE Type E55 was used. In Example 4, Diamide-PAE Type E62 was used. In Example 5, Diamide-PAE Type X4442 was used. As PBN-based TPE there was used "Pelprene EN Type", produced by Toyobo Co., Ltd. In Comparative Example 1, Pelprene EN500 was used. In Example 6, Pelprene EN1000 was used. In Example 7, Pelprene EN2000 was used. In Example 8, Pelprene EN3000 was used. In Example 9, Pelprene EN5000 was used. In Comparative Example 2, Pelprene EN16000 was used. As PBT-based TPE there was used "Pelprene P Type", produced by Toyobo Co., Ltd. In Comparative Example 3, Pelprene P-40H was used. In Comparative Example 4, Pelprene P-55B was used. In Example 10, Pelprene P-70B was used. In Example 11, Pelprene P-90B was used. In Example 12, Pelprene P-150B was used. In Example 13, Pelprene P-280B was used. In Comparative Example 5, Pelprene E-450B was used. PA66, which was used in Comparative Example 6, is "Unreinforced Ultramid A", produced by BASF Japan Ltd. The flexural modulus of the various materials are set forth in Table 4.

(Measurement of Dynamic Frictional Force)

The separators thus obtained were each provided interposed between the balls in a linear guide device ("LH30", produced by NSK Ltd.). Alvania No. 2 grease, which is a mineral oil-lithium soap-based grease, was filled into the ball circulating path of these linear guide devices which were then sealed to prepare testing linear guide devices. The sum of all the gaps between ball and separator of the testing linear guide devices which had just been prepared was 50% of the diameter of the ball. The linear guide devices thus obtained were each then measured for dynamic frictional force at a feed rate of 20 cm/s. In Table 4, the results are set forth relative to the reference dynamic frictional force of Comparative Example 6 as 1. The maximum value of dynamic frictional force which changes in the form of spike during the operation of these linear guide devices are set

TABLE 3

| Separator material | | | | | | | | | | |
| --- | --- | --- | --- | --- | --- | --- | --- | --- | --- | --- |
| | Example 1 | Example 2 | Example 3 | Example 4 | Example 5 | Comparative Example 1 | Example 6 | Example 7 | Example 8 | Example 9 |
| Material | PA12-based TPE | PA12-based TPE | PA12-based TPE | PA12-based TPE | PA12-based TPE | PBN-based TPE | PBN-based TPE | PBN-based TPE | PBN-based TPE | PBN-based TPE |
| Flexural modulus (MPa) | 88 | 132 | 206 | 343 | 490 | 55 | 118 | 157 | 265 | 470 |

| | Comparative Example 2 | Comparative Example 3 | Comparative Example 4 | Example 10 | Example 11 | Example 12 | Example 13 | Comparative Example 5 | Comparative Example 6 |
| --- | --- | --- | --- | --- | --- | --- | --- | --- | --- |
| Material | PBN-based TPE | PBT-based TPE | PBT-based TPE | PBT-TPE | PBT-based TPE | PBT-based TPE | PBT-based TPE | PBT-based TPE | PA66 |
| Flexural modulus (MPa) | 1,597 | 51 | 75 | 108 | 162 | 289 | 494 | 1,267 | 2,890 |

Figure 7:
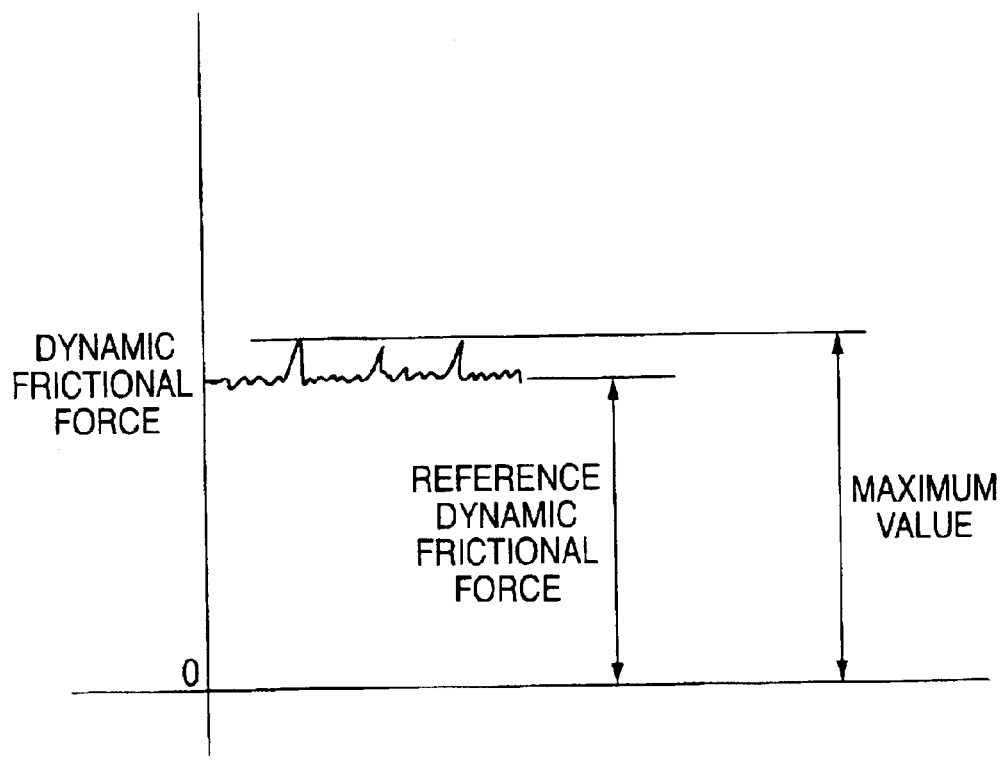
FIG. 7 is a diagram illustrating the reference value and maximum value of dynamic frictional force.

Referring further to the materials used, as PA12-based TPE there was used "Diamide-PAE Type", produced by DAICELHULS LTD. In Example 1, Diamide-PAE Type E40 was used. In Example 2, Diamide-PAE Type E47 was forth in Table 4 on a relative basis. The definition of reference dynamic frictional force and maximum value of dynamic frictional force are diagrammatically illustrated in FIG. 7.

TABLE 4

Measurements of dynamic frictional force (relative to reference dynamic frictional force of Comparative Example 6 as 1)

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Reference dynamic frictional force | 0.95 | 0.95 | 0.96 | 0.97 | 0.98 | 0.95 | 0.95 | 0.96 | 0.98 | 0.95 |
| Maximum value | 1.0 | 1.01 | 1.03 | 1.08 | 1.10 | 1.0 | 1.02 | 1.05 | 1.10 | 1.0 |

|  | Example 11 | Example 12 | Example 13 | Comparative Example 1 | Comparative Example 2 | Comparative Example 3 | Comparative Example 4 | Comparative Example 5 | Comparative Example 6 |
|---|---|---|---|---|---|---|---|---|---|
| Reference dynamic frictional force | 0.95 | 0.96 | 0.98 | 0.95 | 1.0 | 0.95 | 0.95 | 0.99 | 1.0 |
| Maximum value | 1.02 | 1.06 | 1.11 | 1.0 | 1.23 | 1.0 | 1.0 | 1.18 | 1.25 |

As can be seen in Table 4, the use of the material having a flexural modulus of from 80 to 1,000 MPa makes it possible to reduce somewhat the reference dynamic frictional force as an average index of operating characteristics and drastically reduce the maximum value of dynamic frictional force, which affects the operating characteristics. The reduction of dynamic frictional force occurs remarkably with materials having a flexural modulus of not greater than 300 MPa.

(Durability Test)

The testing linear guide devices of Examples 1 to 13 and Comparative Examples 1, 3 and 4 were each allowed to run at a feed rate of 1 m/s and a stroke of 1,000 mm. Every 200 km of running, the testing linear guide devices were each disassembled to measure the sum of the gaps. The percent change of the sum of the gaps from the initial value was then determined. The results are set forth in Table 5 below.

Comparative Examples 1, 3 and 4 have an effect of lowering the maximum value of dynamic frictional force as compared with Comparative Example 6 as shown in Table 4. However, when subjected to durability test, these comparative examples had the separators swollen due to poor grease resistance and thus showed locking. Judging from this grease resistance, too, the flexural modulus of the separator is preferably from 80 to 1,000 MPa.

The comparison of these examples shows that thermoplastic elastomers, even though having the same flexural modulus, have the following tendency of superiority of grease resistance:

PA12-based TPE>PUN-based TPE>PBT-based TPE

Embodiments of the ball screw according to the invention will be described hereinafter in connection with the attached drawings.

TABLE 5

Results of durability test (change of gap)

| Running distance | 0 km | 200 km | 400 km | 600 km | 800 km | 1,000 km | Remarks |
|---|---|---|---|---|---|---|---|
| Example 1 | 50.0% | 53.0% | 53.2% | 53.4% | 53.6% | 54.0% | Continuous running possible |
| Example 2 | 50.0% | 51.5% | 51.8% | 52.0% | 52.1% | 52.2% | Continuous running possible |
| Example 3 | 50.0% | 51.0% | 51.2% | 51.3% | 51.6% | 51.8% | Continuous running possible |
| Example 4 | 50.0% | 50.8% | 50.9% | 51.0% | 51.1% | 51.2% | Continuous running possible |
| Example 5 | 50.0% | 50.4% | 50.5% | 50.6% | 50.7% | 50.8% | Continuous running possible |
| Example 6 | 50.0% | 52.8% | 53.3% | 53.5% | 53.8% | 54.0% | Continuous running possible |
| Example 7 | 50.0% | 51.5% | 51.8% | 52.0% | 52.3% | 52.5% | Continuous running possible |
| Example 8 | 50.0% | 51.2% | 51.5% | 51.8% | 52.0% | 52.1% | Continuous running possible |
| Example 9 | 50.0% | 50.8% | 51.2% | 51.3% | 51.4% | 51.5% | Continuous running possible |
| Example 10 | 50.0% | 60.0% | 62.0% | 65.0% | 66.0% | 67.0% | Continuous running possible |
| Example 11 | 50.0% | 59.0% | 61.0% | 63.0% | 65.0% | 66.0% | Continuous running possible |
| Example 12 | 50.0% | 57.0% | 58.0% | 60.0% | 64.0% | 65.0% | Continuous running possible |
| Example 13 | 50.0% | 55.0% | 56.0% | 57.0% | 58.0% | 60.0% | Continuous running possible |
| Comparative Example 1 | 50.0% | 66.0% | Operation suspended | Operation suspended | Operation suspended | Operation suspended | LG locked at 250 km |
| Comparative Example 3 | 50.0% | 67.0% | Operation suspended | Operation suspended | Operation suspended | Operation suspended | LG locked at 230 km |
| Comparative Example 4 | 50.0% | 62.0% | 67.0% | Operation suspended | Operation suspended | Operation suspended | LG locked at 430 km |

The testing linear guide devices of Examples 1 to 13 showed little gap change and no falling of separators even after 1,000 km of running, demonstrating that the testing linear guide devices had been kept running in a stable manner. On the contrary, the testing linear guide devices of Comparative Examples 1, 3 and 4 showed a great change of gap and was early unable to run. The testing was then suspended.

[Third Embodiment]

Figure 8:
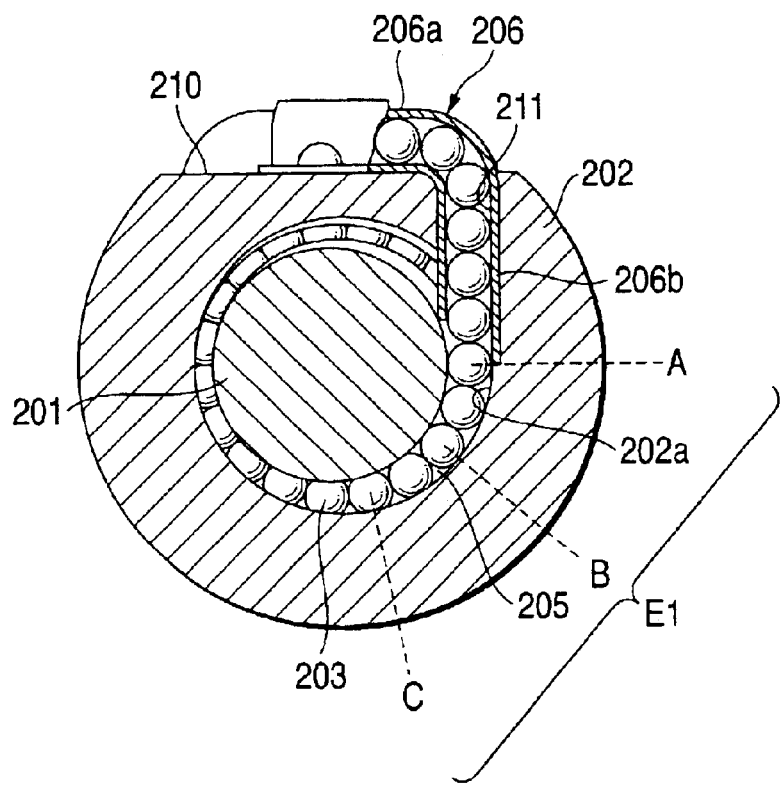
FIG. 8 is a sectional view illustrating the arrangement of a ball screw according to the third embodiment of implementation of the invention.
Figure 9:
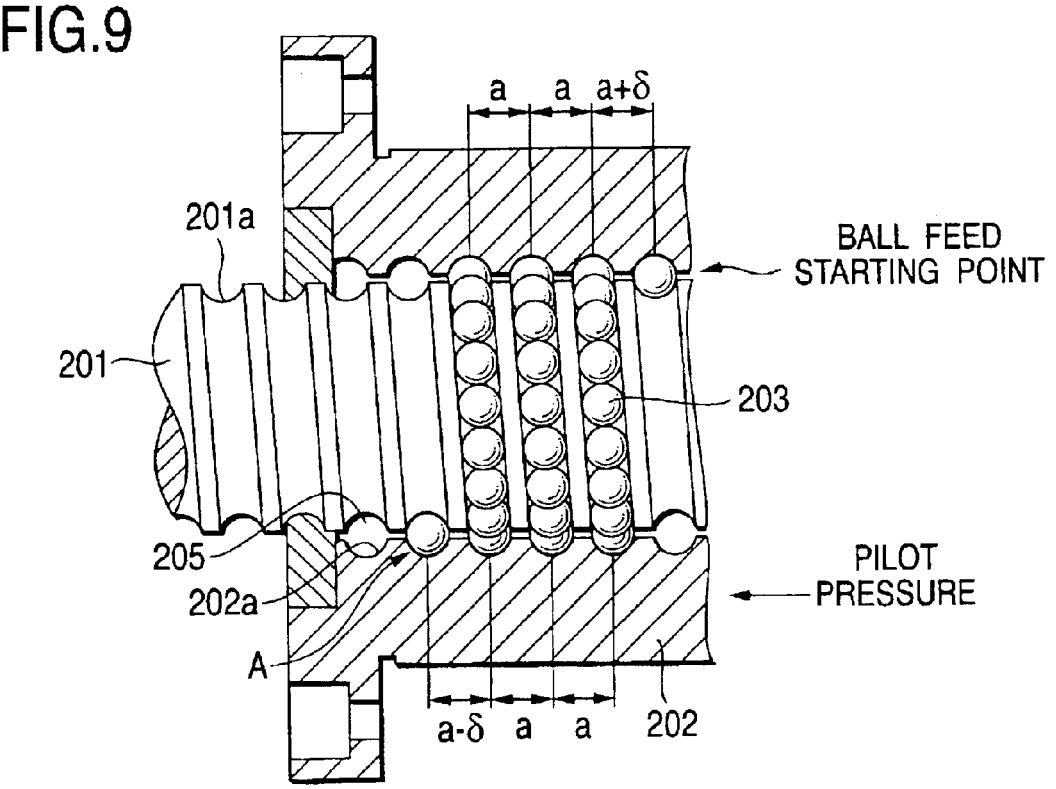
FIG. 9 is a partially sectional view illustrating the arrangement of the ball screw according to the third embodiment of implementation of the invention.

FIG. 8 is a sectional view illustrating a double nut type two-point contact ball screw according to the third embodiment of implementation of the invention taken along a plane perpendicular to the axis thereof. FIG. 9 is a partially sectional view taken along a plane extending through the point A and the center of axis in FIG. 8.

This ball screw comprises a screw shaft 201 having a spiral thread groove 201a provided on the outer surface thereof, a cylindrical nut 202 having a spiral thread groove 202a provided on the inner surface thereof opposed to the thread groove 201a of the screw shaft 201 and engaged with the screw shaft 201, and a large number of balls 203 mounted rollably on a spiral ball rolling path 205 formed by the thread groove 201a of the screw shaft 201 and the thread groove 202a of the nut 202. The nut 202 engaged with the screw shaft 201 with the large number of balls 203 interposed therebetween and the screw shaft 201 make relative movement with each other with the rolling of the balls 203.

The thread grooves 201a and 202a each are in the form of Gothic arch. These thread grooves each have a U-shaped section comprising in combination two arcs having the same size but different centers of curvature.

The balls 203 in the ball rolling path 205 are given a pilot pressure in the direction shown by the arrow in FIG. 9. The balls 203 come in contact with the thread groove 202a of the nut 202 at one point and the thread groove 201a of the screw shaft 201 at one point opposed thereto. In the direction perpendicular to the line extending through the two points, the ball 203 doesn't come in contact with the thread grooves 201a, 202a or, even when the ball 203 comes in contact with the thread grooves 201a, 202a, they are not given a pilot pressure (see FIG. 10C).

The nut 202 has a flat surface provided on a part of the outer surface thereof. To the flat surface parallel to the axis of the ball screw (hereinafter referred to as "mounting surface 210 for return tube 206") is fixed a return tube 206 which is bent in the form of U. In other words, the nut 202 has a pair of holes 211, 211 opened at the mounting surface 210 and communicating to the thread groove 202a. The return tube 206 is inserted in the holes 211, 211 on the mounting surface 210 at the both ends 206b thereof, respectively. The central portion 6a of the return tube 206 disposed outside the holes 211, 211 is provided above the mounting surface 210. Two or more return tubes may be mounted on one nut. In this case, two or more pairs of holes are provided.

The balls 203 rolling through the ball rolling path 205 are circulated through the return tube 206. In other words, the balls 203 move through the ball rolling path 205 until they move around the screw shaft 201 plural times. At one end A of the ball rolling path 205 (intersection of the return tube 206 with the ball rolling path 205), the balls 203 are caught by the return tube 206 at one end 206b (opening) thereof. The balls 203 thus caught pass through the return tube 206, and then are returned to the other end of the ball rolling path 205 at the other end (opening) of the return tube 206.

In the zone E1 (zone extending from the one end A to the point C in FIG. 8), which is positioned backward of the one end A, in the vicinity of the one end A (ball catch starting point) of the ball rolling path 205, the lead angle of the thread groove 202a of the nut 202 gradually changes. In other words, the change of the lead angle of the thread groove 202a of the nut 202 begins with the end C of the zone E1 and ends with the one end A of the ball rolling path 205. Of course, the sectional shape of the thread groove 202a doesn't change through the zone E1.

Figure 10A:
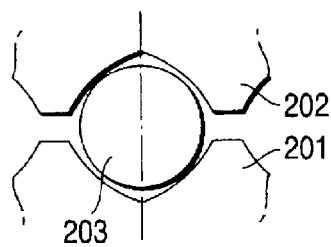
FIGS. 10A to 10C are sectional views illustrating the state of contact of the balls with the thread groove.
Figure 10B:
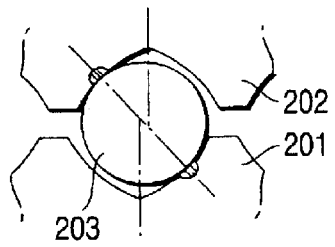
Figure 10C:
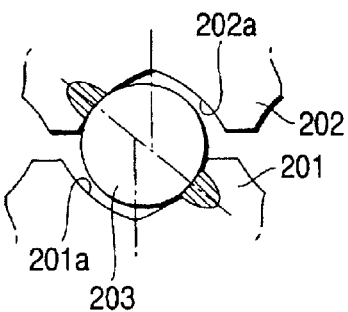

A normal pilot pressure is given at the end C of the zone E1 (see FIG. 10C). As the lead angle of the thread groove 202a changes as mentioned above, the pilot pressure decreases gradually from the end C toward the one end A. The pilot pressure is reduced at the middle position B of the zone E1 (i.e., position backward of the one end A of the ball rolling path 205) (see FIG. 10B). At the one end A, the pilot pressure is completely released (see FIG. 10A). Accordingly, the movement of the balls 203 in the vicinity of the ball catch starting point can be smoothly effected, causing the balls 203 to pass through the ball catch starting point smoothly and hence making it difficult to cause vibration due to the passage of balls.

Since the lead angle changes as mentioned above, the pitch of the thread groove 202a of the nut 202 is as shown in the sectional view of FIG. 9. In other words, the thread groove 201a of the screw shaft 201 is formed at the same pitch a over the length of the screw shaft 201. The thread groove 202a of the nut 202 is formed at a pitch corresponding to that of the thread groove 201a. However, at the one end A, where the pilot pressure is completely released, the thread groove 202a is formed at a pitch a-δ which is different from the pitch a.

The change of pitch δ (change of lead angle) is predetermined to a proper value such that the pilot pressure is released at the catch starting point and the thread groove can be communicated to the ball catching portion (opening) of the return tube 206 without any difference of level taking into account the axial deformation of elasticity of ball or thread groove, dispersion of pilot pressure, dispersion of size of parts, etc. This value varies with the kind, size and other properties of the ball screw to which the invention is applied.

The zone which is positioned backward of the other end of the ball rolling path 205 (position at which the balls 203 are returned from the return tube 206 to the ball rolling path 205, which is "ball feed starting point" in FIG. 9) in the vicinity of the other end of the ball rolling path 205 has the same arrangement as the zone E1. However, at the other end of the ball rolling path 205, where the pilot pressure is completely released, the thread groove 202a is formed at a pitch of a+δ as shown in FIG. 9.

The return tube 206 will be further described hereinafter.

Figure 11:
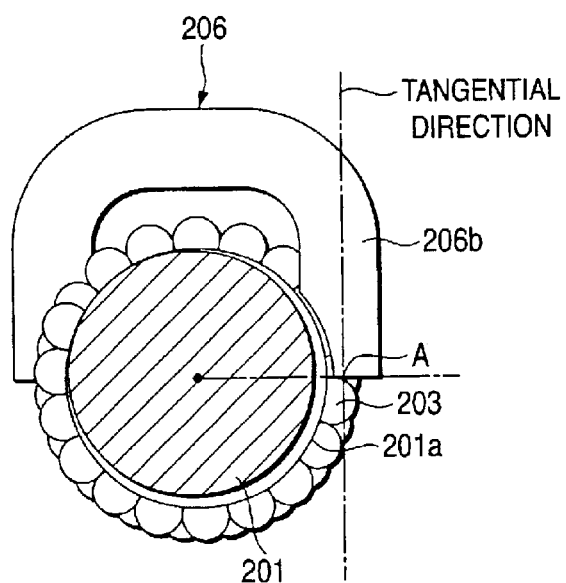
FIG. 11 is a diagram illustrating how the return tube is disposed.

The both ends 206b of the return tube 206 inserted in the holes 211, respectively, are disposed in the direction tangential to the ball rolling path 205 at the both ends of the ball rolling path 205 as viewed in the axial direction of the nut 202 as shown in FIG. 11 (illustrating the screw shaft 201 and the return tube 206 as viewed in the axial direction).

The term "direction tangential to the ball rolling path 205 as viewed in the axial direction of the nut 202" as used herein is meant to indicate a two-dimensional direction in a front view as viewed in the axial direction of the ball screw rather than a three-dimensional direction in the actual ball screw.

In other words, the both ends 206b of the return tube 206 are not necessarily disposed parallel to the front surface of FIG. 11 in practice but may be disposed obliquely to the front surface of FIG. 11 so far as they are disposed in the direction tangential to the ball rolling path 205 as viewed in the axial direction of the nut 202 (on a view developed by projecting the return tube 206 straight on a plane perpendicular to the axis of the ball screw).

Figure 12:
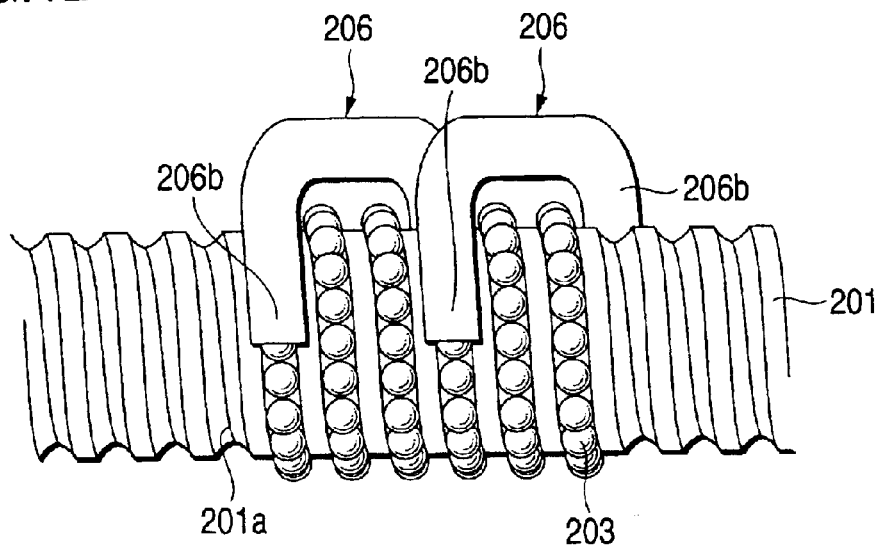
FIG. 12 is a diagram illustrating how the return tube is disposed.

Further, the both ends 206b of the return tube 206 are disposed along the ball rolling path 205 (track for the balls 203), i.e., in the direction of lead angle as shown in FIG. 12 (in the case where two return tubes 206 are disposed).

In this arrangement, the direction of movement of the balls 203 through the ball rolling path 205 coincides with the direction of disposition of the ends 6 of the return tube 206, making it difficult for the balls 203 to collide with the inner surface of the return tube 206 during the movement from the ball rolling path 205 to the return tube 206. Thus, when the balls 203 are caught by the return tube 206 from the ball rolling path 205, the movement of the balls 203 can be smoothly effected at the end 206b of the return tube 206. Accordingly, even when the ball screw is used at a high feed rate or high rotary speed, the balls can be fairly circulated and the ball screw can be fed with an excellent precision. Further, the vibration of the ball screw due to the passage of the balls through the ball catch starting point can be prevented. This effect is exerted also when the balls 203 are returned from the return tube 206 to the ball rolling path 205.

The aforementioned effect can be exerted also when the both ends 206b of the return tube 206 are in only one of the aforementioned tangential direction and the direction of lead angle. However, a better effect can be exerted when the both ends 206b of the return tube 206 are in both the aforementioned tangential direction and the direction of lead angle.

[Fourth Embodiment]

Figure 13:
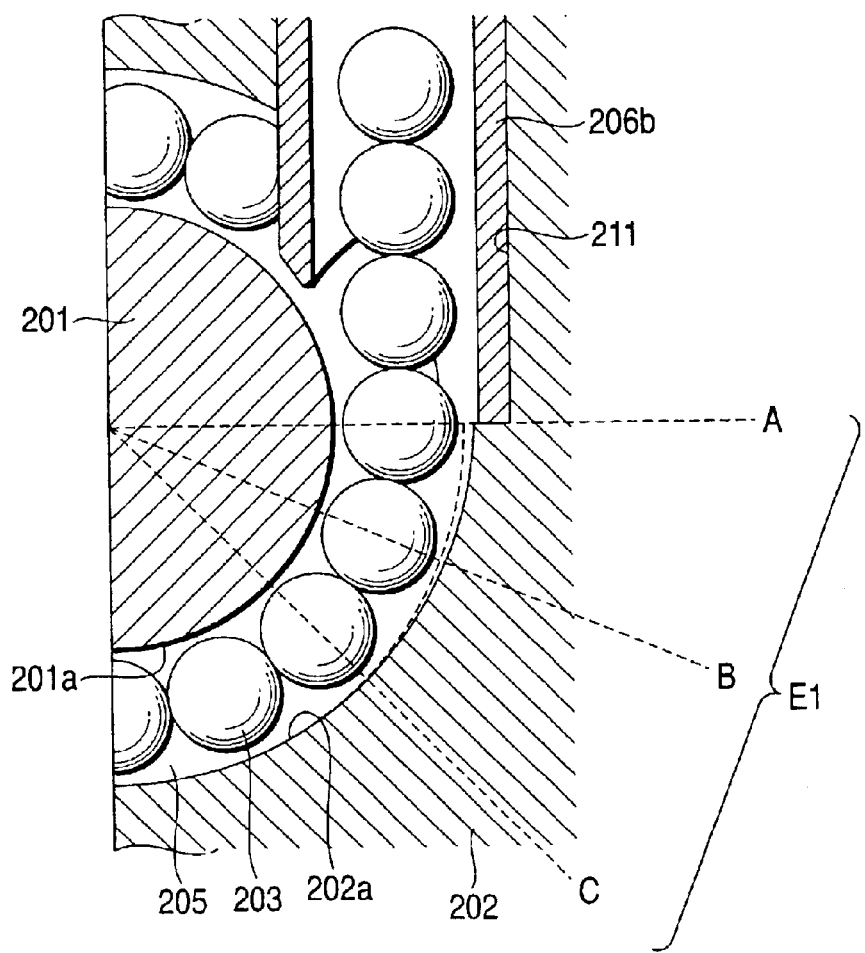
FIG. 13 is a partly enlarged view illustrating the arrangement of a ball screw according to the fourth embodiment of implementation of the invention.

FIG. 13 is a partially enlarged view of the ball catch starting point illustrating a ball screw according to the fourth embodiment of implementation of the invention (sectional view taken along a plane perpendicular to the axis of the ball screw). Since the arrangement and action of the ball screw according to the fourth embodiment are almost the same as that of the third embodiment, only parts different from the third embodiment will be described in connection with FIGS. 9 and 10 and the description of the same parts as in the first embodiment will be omitted. In FIG. 13, the parts corresponding to those of FIGS. 1 and 2 are given the same reference numerals an signs as used in FIGS. 9 and 10.

In the ball screw according to the fourth embodiment of implementation of the invention, the lead angle of the thread groove 202a of the nut 202 doesn't change while the diameter of the thread groove 202a of the nut 202 changes.

In the zone E1 (zone extending from the one end A to the point C in FIG. 13), which is positioned backward of the one end A, in the vicinity of the one end A (ball catch starting point) of the ball rolling path 205, the diameter of thread groove 202a of the nut 202 gradually increases (with respect to the normal diameter shown by the broken line). In other words, the increase of the diameter of the thread groove 202a of the nut 202 begins with the end C of the zone E1 and ends with the one end A of the ball rolling path 205.

The balls 203 are normally restricted at the end C of the aforementioned zone E1 (see FIG. 10C). As the diameter of the thread groove 202a of the nut 202 increases, the constraint on the balls 203 is gradually released starting from the end C to the one end of the ball rolling path 205. The constraint on the balls 203 is reduced at the middle position B (i.e., shortly backward of the one end A of the ball rolling path 205) (see FIG. 10B). The constraint on the balls 203 is completely released (see FIG. 10A). Accordingly, the movement of the balls 203 in the vicinity of the ball catch starting point can be smoothly effected, causing the balls 203 to pass through the ball catch starting point smoothly and hence making it difficult to cause vibration due to the passage of balls.

The method for gradually increasing the diameter of the thread groove 202a of the nut 202 is not specifically limited but is preferably crowning or like machining.

The both ends 206b of the return tube 206 may be disposed in both the aforementioned tangential direction and the direction of lead angle as in the first embodiment or in only one of the two directions.

The lead angle of the thread groove 202a of the nut 202 may change with the increase of the diameter of the thread groove 202a of the nut 202 as in the first embodiment.

[Fifth Embodiment]

Figure 14:
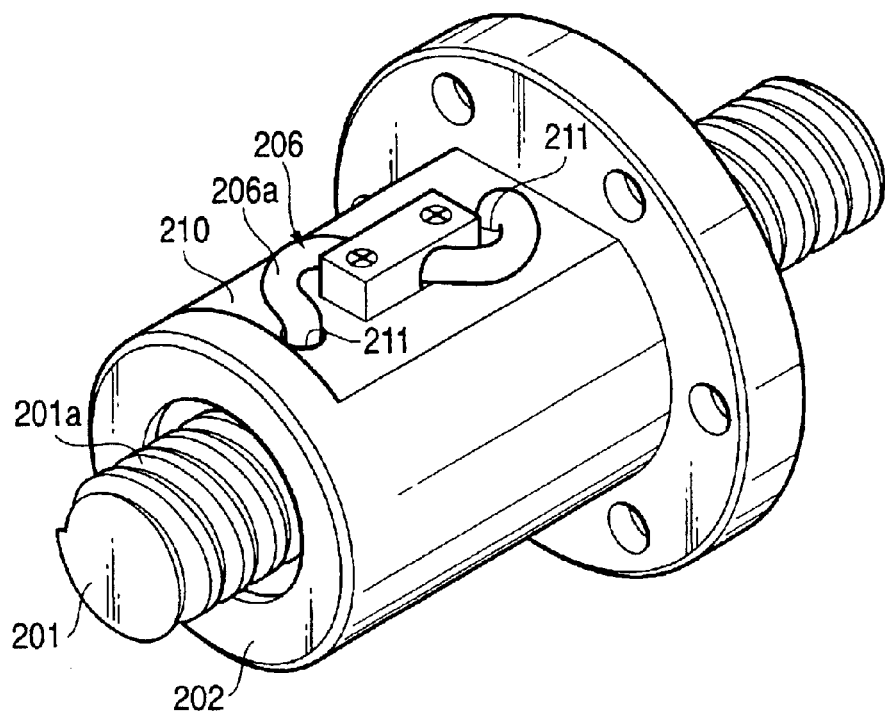
FIG. 14 is a perspective view illustrating the arrangement of a ball screw according to the fifth embodiment of implementation of the invention.

The ball screw according to the fifth embodiment shown in FIG. 14 involves a modification of the return tube 206 in the third or fourth embodiment of implementation of the invention. Since the other arrangement and action of the fifth embodiment are almost the same as that of the third and fourth embodiments, only parts different from that of the third and fourth embodiments will be described and the description of the same parts as in the third and fourth embodiments will be omitted. In FIG. 14, the parts which are the same as or correspond to those of FIG. 8 are given the same reference numerals and signs as those of FIG. 8.

The ball screw according to the fifth embodiment of implementation of the invention is different from the third and fourth embodiments of implementation of the invention in that the central portion 6a of the return tube 206, i.e., portion disposed outside the holes 211, 211 and above the mounting surface 210 is curved (S-shaped in the case of FIG. 14). The line between the two holes 211, 211 on the mounting surface 210 is substantially parallel to the screw shaft 201.

Thus, the return tube 206 is smoothly curved, causing the direction of movement of the balls 203 through the return tube 206 to change slowly and hence causing the balls 203 to move smoothly through the return tube 206. Accordingly, the balls can be fairly circulated and the ball screw can be fed with an excellent precision. Further, the occurrence of vibration and noise in the return tube 206 can be inhibited.

[Sixth Embodiment]

Figure 15:
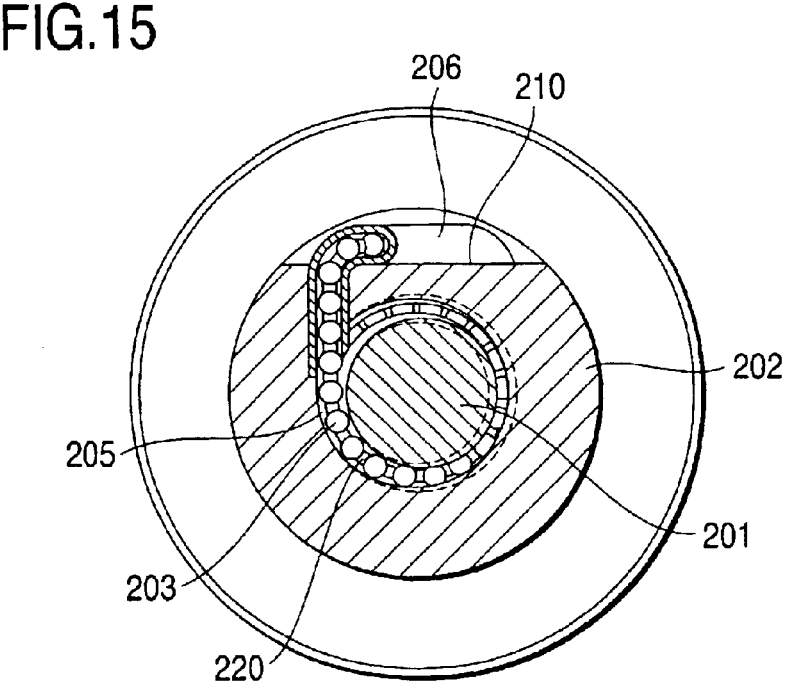
FIG. 15 is a perspective view illustrating the arrangement of a ball screw according to the sixth embodiment of implementation of the invention.

The ball screw according to the sixth embodiment shown in FIG. 15 (sectional view taken along a plane perpendicular to the axis of the ball screw) is a modification of the ball screw according to the third to fifth embodiments involving the disposition of a spacer interposed between the balls 203. Since the other arrangements and actions of the sixth embodiment are almost the same as that of the third to fifth embodiments, only the parts different from those of the third to fifth embodiments will be described and the description of the same parts as those of the third to fifth embodiments will be omitted.

Figure 16:
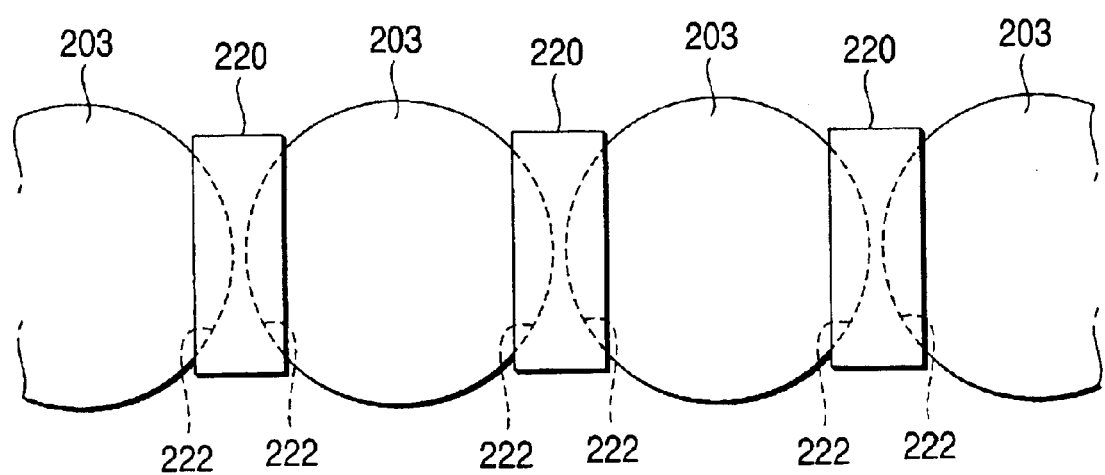
FIG. 16 is an enlarged view of the essential part of FIG. 15.

The spacer 220 has curved surfaces 222, 222 which are concave surfaces in sliding contact with a part of the surface of the adjacent balls 203, 203, respectively, as shown in FIG. 16, which is an enlarged view of the essential part of FIG. 15. The shape of the spacer 220 is not necessarily limited to that described above.

When such a spacer 220 is provided interposed between the balls 203, there occurs no competition of balls, making it possible to move the balls 203 smoothly. Accordingly, the balls can be better circulated and the ball screw can be fed with a better precision. The occurrence of vibration due to passage of balls can be further inhibited. Further, the movement of the balls 203 through the return tube 206 can be effected more smoothly, making it possible to prevent the occurrence of vibration and noise.

The same effect can be exerted also when a spherical element (spacer ball) having a smaller diameter than that of the ball 203 is used instead of the spacer 220.

The spacer 220 or spacer ball is preferably formed by a material having excellent sliding properties.

The various embodiments mentioned above each are only illustrative and the invention is not limited thereto. While the various embodiments have been described with reference to a double nut type ball screw, it goes without saying that the invention can be applied to a single nut type ball screw without any problems.

Figure 17:
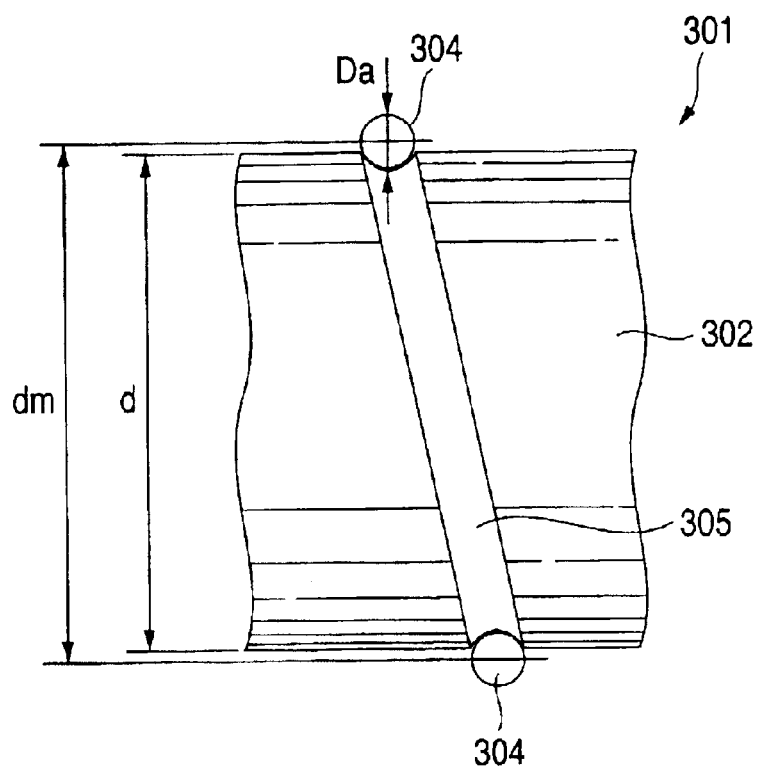
FIG. 17 is a diagram of ball screw illustrating the seventh embodiment of implementation of the invention.
Figure 18:
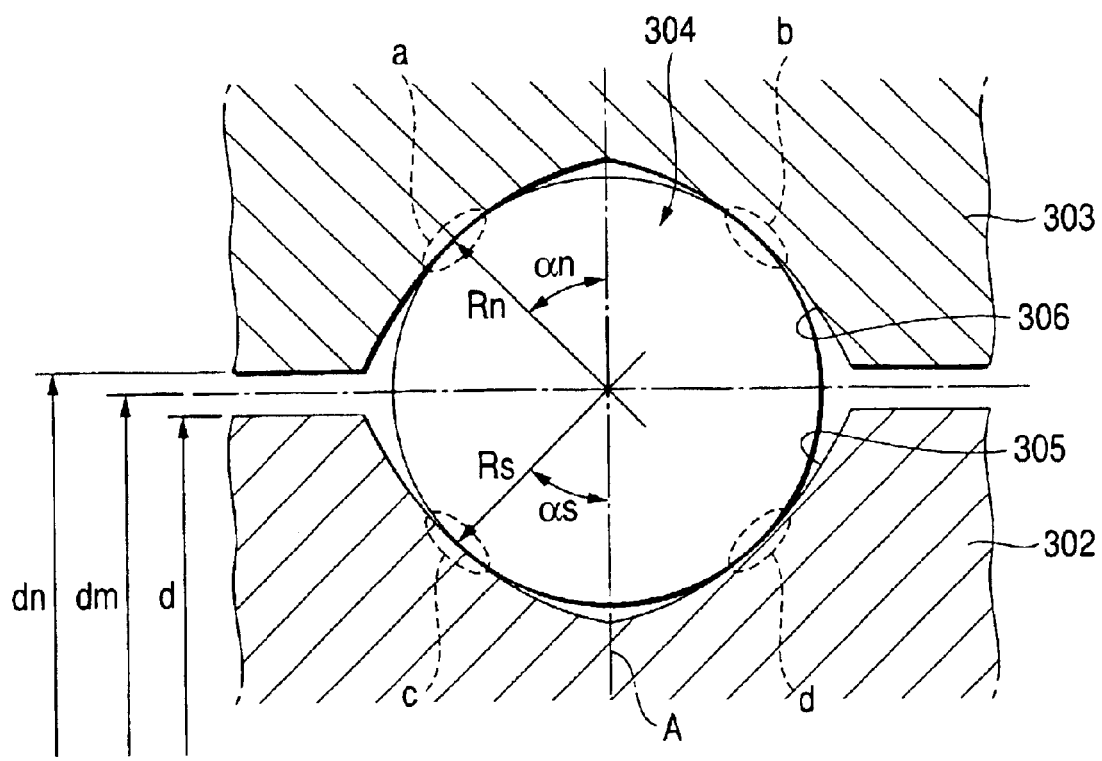
FIG. 18 is an enlarged sectional view illustrating the form of the ball and groove according to the seventh and eighth embodiments.

The embodiments of implementation of the invention will be described in detail in connection with the attached drawings. FIG. 17 is a schematic diagram illustrating the pitch diameter dm, axis diameter d and ball diameter Da of the ball screw according to the seventh embodiment. FIG. 18 is an enlarged sectional view of essential part illustrating the relationship between ball and groove.

A ball screw 301 comprises a screw shaft 302 which rotates by a driving portion such as motor (not shown), a nut 303 which is mounted so as to move over the screw shaft 302 in the direction of axis of the screw shaft 302, and a plurality of balls 304. The plurality of balls 304 are sequentially provided between a thread groove 305 formed spirally on the outer surface of the screw shaft 302 and a nut thread groove 306 formed spirally on the inner surface of the nut 303. In other words, the ball screw 301 is of all ball type.

In the present embodiment, the screw shaft diameter d, lead, ball diameter Da, and ball pitch circle diameter (pitch diameter) dm are predetermined to 40 mm, 10 mm, 4 mm and 40.5 mm, respectively, and there are two lines of 2.5 turns. The pitch diameter dm is the radial distance between the center of balls 304 which are disposed on the thread groove 305 opposed to each other at an angle of 180°. The pitch diameter dm is 1.25% greater than the thread groove d.

As shown in FIG. 18, the thread groove 305 and the nut thread groove 306 are formed in Gothic arch symmetrical with respect to the straight line A extending radially of the thread 302.

In the present embodiment, both the radius Rn of curvature of groove on the nut 303 side and the radius Rs of curvature of groove on the screw shaft 302 side are predetermined to 2.12 mm and both the rest angle an on the nut 303 side and the rest angle αs on the screw shaft 302 side are predetermined to 45°. The rest angle is the angle made by the straight line extending between the contact point of the ball 304 on the contact section of the thread groove 305 and the center of the ball 304 and the straight line A extending through the center of the ball perpendicularly to the axis.

In the aforementioned arrangement, the ratio Da/dm of ball diameter Da to pitch diameter dm is 0.0988.

Various measurements were conducted while the ball screw was operated at an axial load of 5 kN and an axis rotary speed of 1,700 rpm with dm fixed to 41 mm and the ball diameter Da and number of balls being varied.

Table 6 shows sets of ball diameter and number of balls per 2.5 turns (one line).

TABLE 6

| Ball diameter (mm) | Number of balls/2.5 turns |
|---|---|
| 2 | 161 |
| 3.5 | 92 |
| 4 | 80 |
| 5 | 64 |
| 6.35 | 50 |
| 8 | 40 |
| 10 | 32 |
| 12.5 | 25 |

Figure 19:
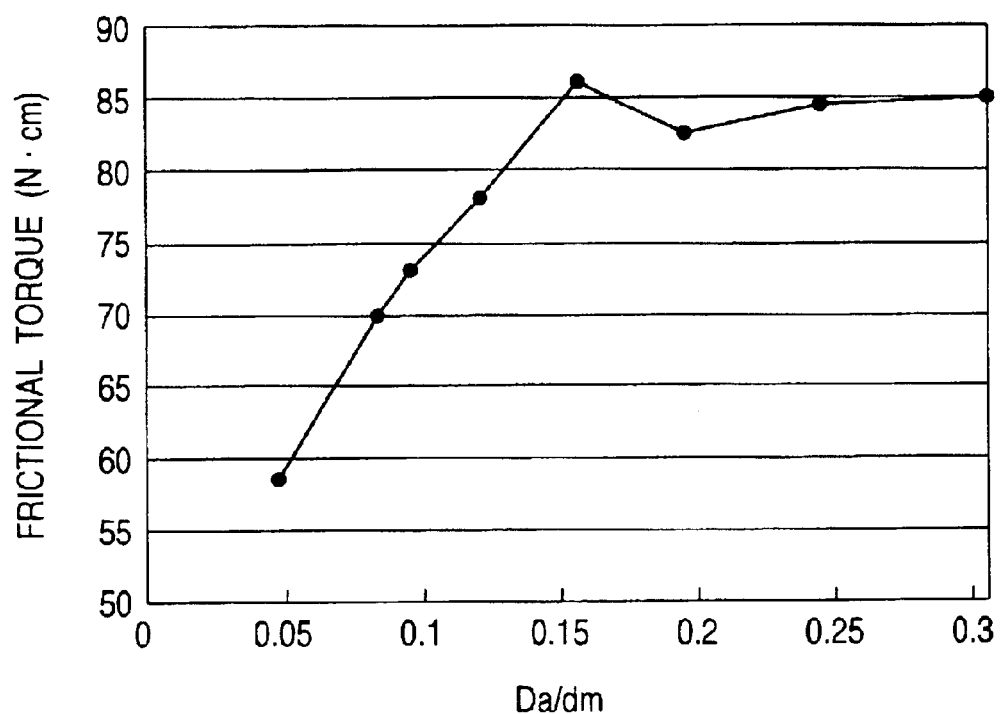
FIG. 19 is a characteristic curve illustrating the relationship between Da/dm and frictional torque in the seventh embodiment.

In FIG. 19, the abscissa indicates Da/dm and the ordinate indicates the frictional torque of the track (thread groove and nut thread groove) with the ball. As can be seen in FIG. 19, the friction decreases as Da/dm decreases from 0.15.

Figure 20A:
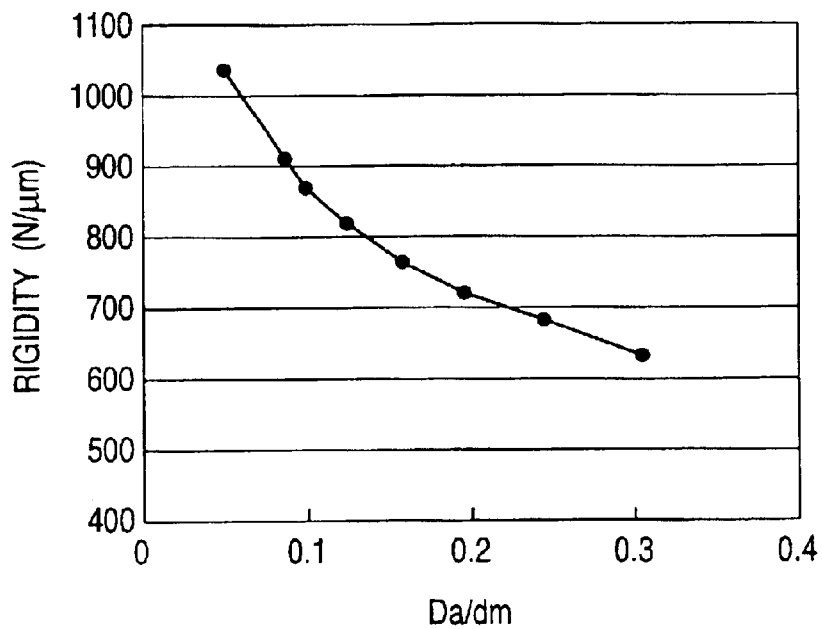
FIGS. 20A and 20B are characteristic curves illustrating the relationship between Da/dm and rigidity/life in the seventh embodiment.
Figure 20B:
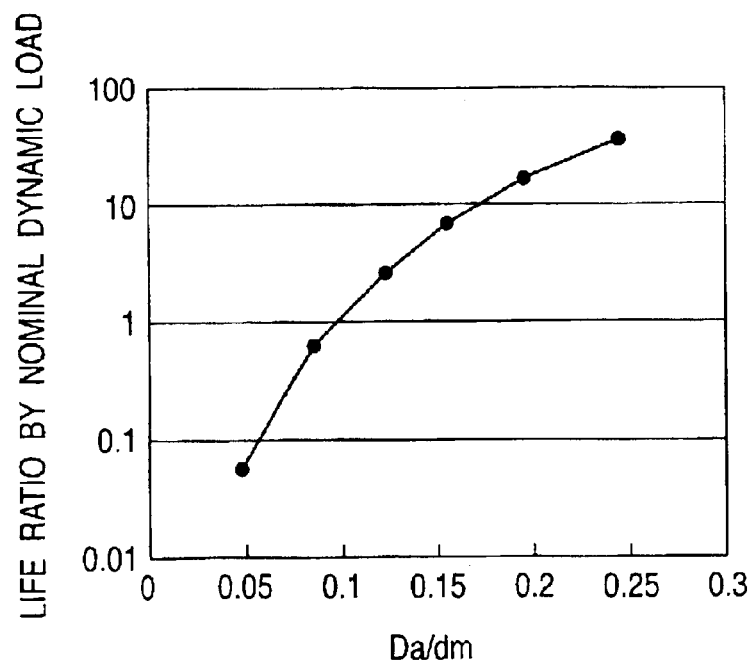

Further, as can be seen in FIG. 20A, the rigidity can be raised more by decreasing Da/dm and increasing the number of balls. However, as shown in FIG. 20B, when Da/dm falls below 0.05 (ball diameter: 2 mm; see Table 6), the life is reduced more than one tenth due to nominal dynamic load. Accordingly, the lower limit of Da/dm is 0.05.

Figure 21:
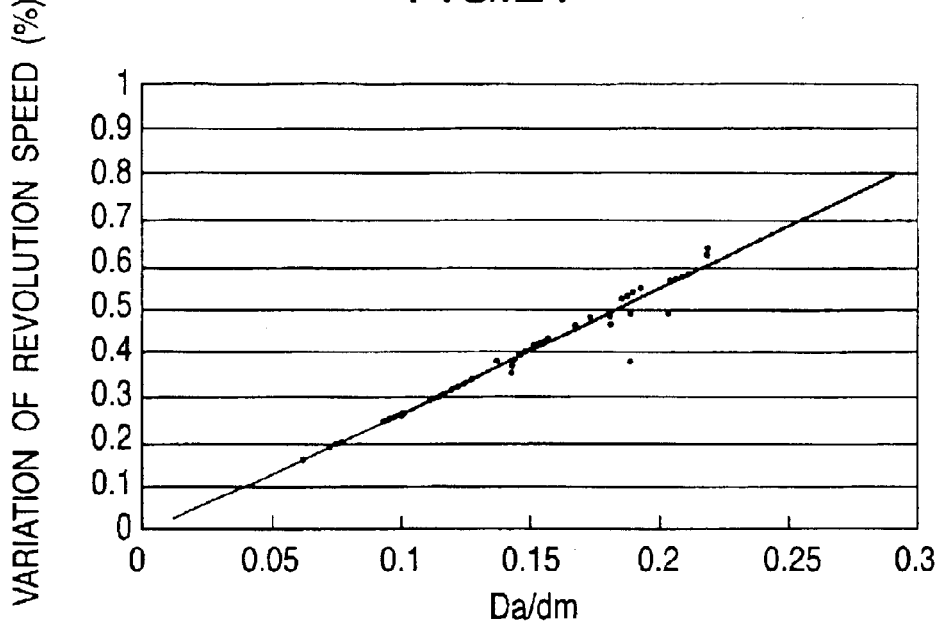
FIG. 21 is a characteristic curve simulating Da/dm and variation of revolution speed in the seventh embodiment.

On the other hand, even when Da/dm is not smaller than 0.15, the friction with the track shows no rise as shown in FIG. 19. However, as can be seen in FIG. 21, the variation of revolution speed rises with the rise of Da/dm. Therefore, the effect of collision and friction of balls makes the rise of entire frictional torque and variation thereof unavoidable. Accordingly, the variation of operational torque is less when Da/dm is not greater than 0.2.

The ball screw according to the eighth embodiment will be described hereinafter. In the present embodiment, the screw shaft diameter d, lead, and ball diameter Da were predetermined to 40 mm, 10 mm and 6.35 mm, respectively. The radius of curvature of groove on the screw shaft side and on the nut side were equally predetermined to a range of from 3.3 to 3.365 mm, Further, all the rest angles were predetermined to 45°. The number of turns and the radial gap were predetermined to 2.5 (2 lines) and 0.004 mm, respectively.

Figure 22:
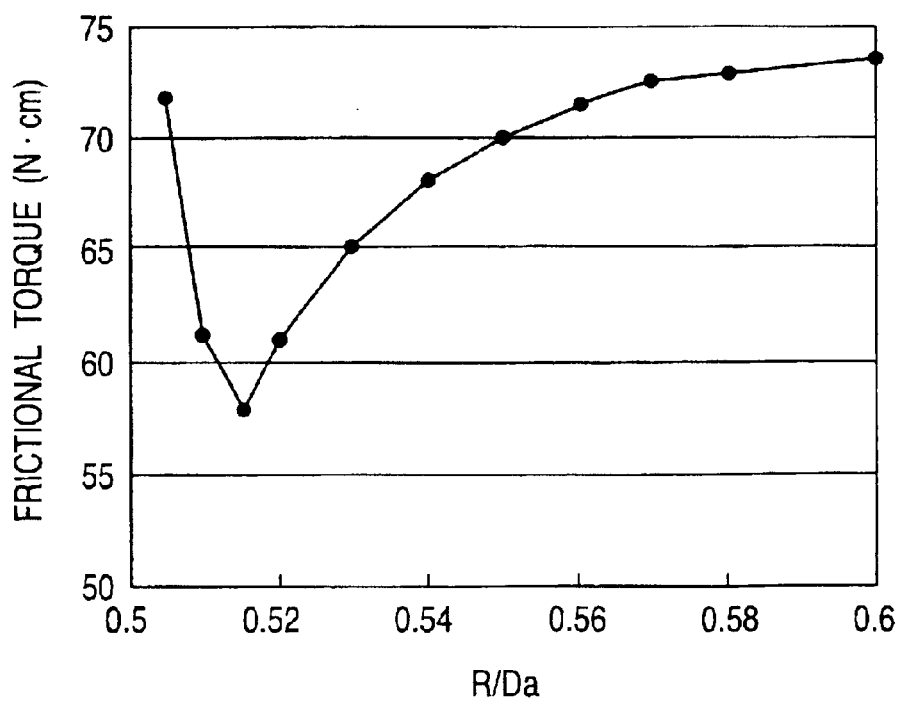
FIG. 22 is a characteristic curve illustrating the change of friction torque in the eighth embodiment.

The frictional torque at an axial load of 5 kN and an axis rotary speed of 1,000 rpm was determined by calculating the rolling viscosity resistance and sliding friction from the track and the movement of ball. FIG. 22 shows the results of the calculation. The abscissa indicates R/Da obtained by dividing the radius R of curvature of groove (corresponding to radius Rn, Rs of FIG. 18) by the ball diameter Da and the ordinate indicates the frictional torque.

Referring to the rotary conditions, the screw shaft 302 is rotated against the direction in which the axial load is imposed. In FIG. 18, when the load is imposed on the opposing contact surfaces a (nut thread groove 306) and d (thread groove 305), the conversion to linear-motion causes the balls 304 to be pushed toward the contact surface b (nut thread groove 306) during rotation. In many cases, the balls 304 come in additional contact with the contact surface b, totaling three contacts. As can be seen in FIG. 22, in the present embodiment, when R/Da is not smaller than 0.515, the balls 304 make three-point contact. When R/Da is not greater than 0.51, the balls 304 make two-point contact.

When R/Da is not smaller than 0.515, the load imposed on the contact surface b increases as R/Da increases, giving a tendency that the entire frictional torque increases due to sliding heat on the contact surface b. On the contrary, as R/Da decreases, the rolling friction and sliding friction on the contact surfaces a, d, on which the load is mainly imposed, increase. When the frictional force of the contact surfaces a, d with the balls 304 increases, the movement of the balls 304 to the contact surface b is inhibited.

When R/Da is not greater than 0.515, there occurs little or no contact with the contact surface b. Further, when R/Da is not greater than 0.51, there occurs only two-point contact on the contact surfaces a, d, increasing heat generation.

Figure 23A:
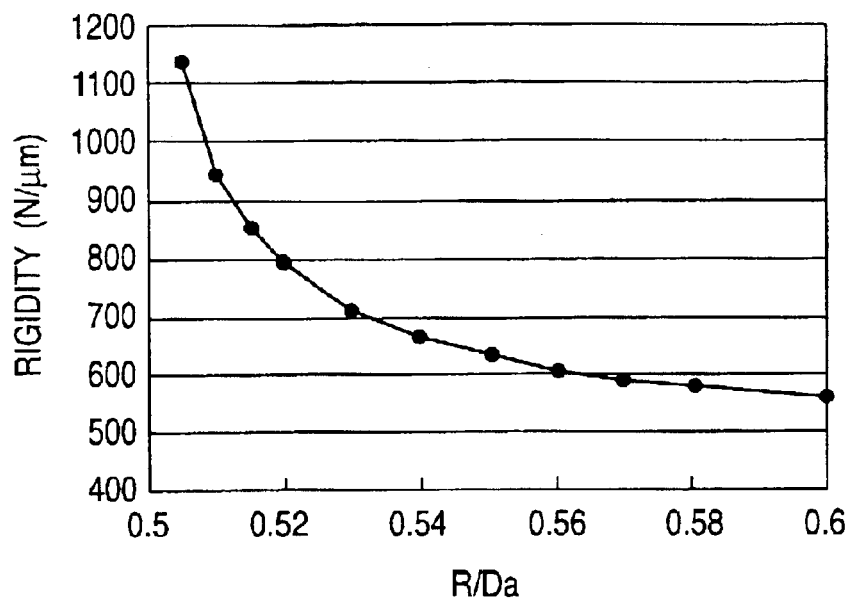
FIGS. 23A and 23B are characteristic curves illustrating the relationship between Da/dm and rigidity/life in the eighth embodiment.
Figure 23B:
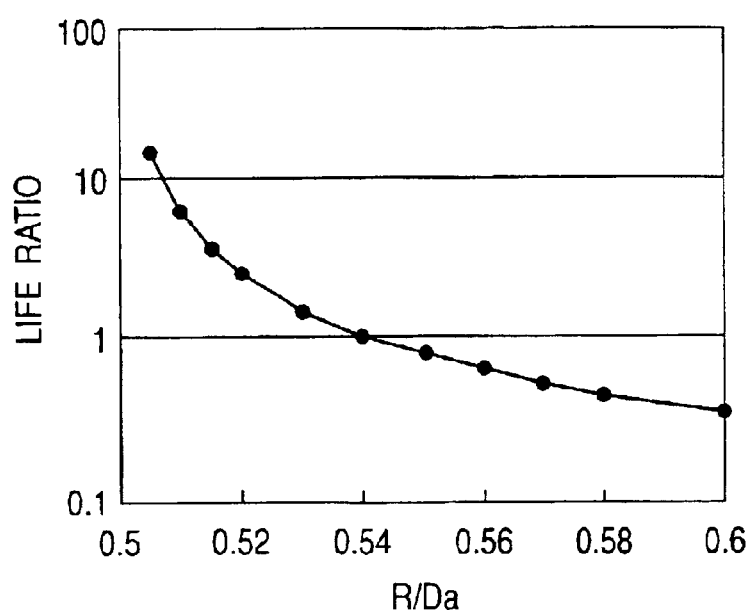

On the other hand, the rigidity is drastically reduced when R/Da is not smaller than 0.58 as shown in FIG. 23A. The life is drastically reduced when R/Da is not smaller than 0.58 as shown in FIG. 23B. Accordingly, R/Da is preferably from 0.51 to 0.57.

The ball screw according to the ninth embodiment will be described in connection with FIGS. 24A and 24B. The main difference between the present embodiment and the seventh and eighth embodiments is that the radius of curvature of thread groove and nut thread groove are different from each other. The members having the same action as those of the seventh and eighth embodiments are given the same reference numerals and signs as in the seventh and eighth embodiments and their description will be omitted.

Figure 24A:
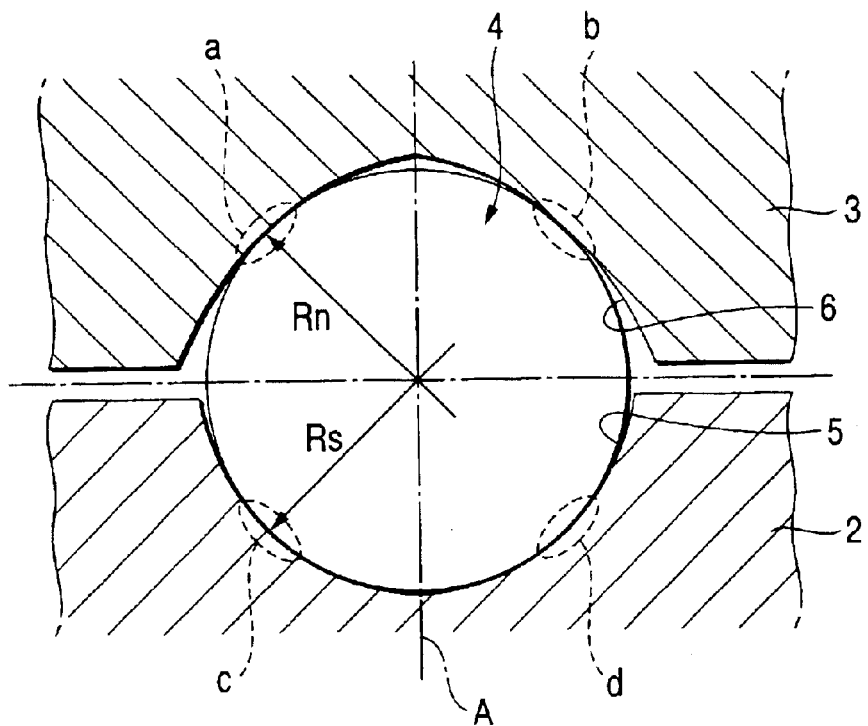
FIGS. 24A and 24B are enlarged sectional views of essential part illustrating the relationship between ball and groove in the ninth embodiment.
Figure 24B:
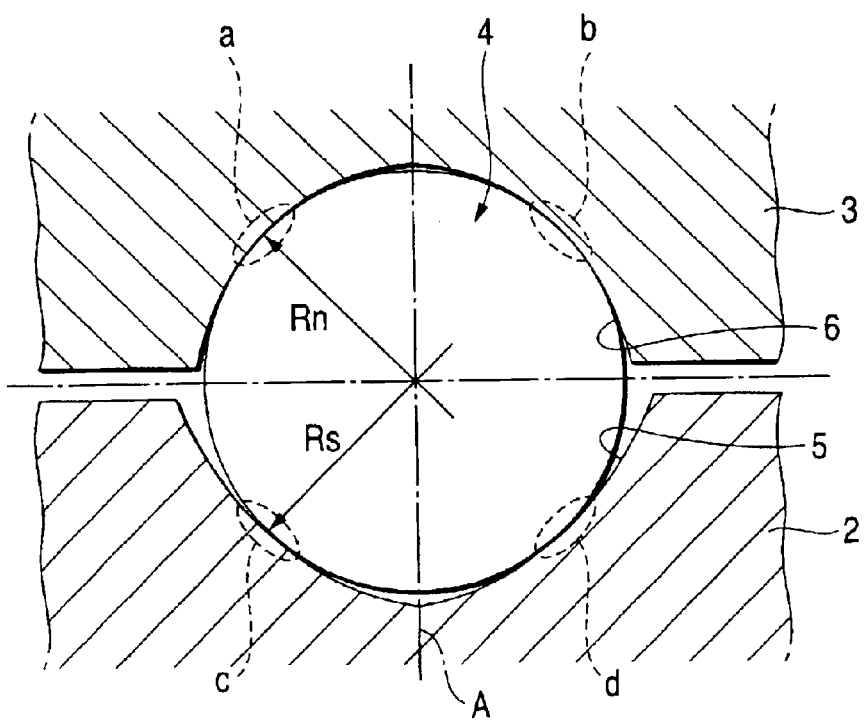

In the present embodiment, as shown in FIG. 24A, the ratio of radius Rn of curvature of groove of nut 303 to ball diameter Da(fn=Rn/Da) is predetermined to 0.54 and the ratio of radius Rs of curvature of thread groove 302 to ball diameter Da (fs=Rs/Da) is predetermined smaller than 0.54. In this arrangement, the radius of curvature of groove on the screw shaft 302 side is reduced to raise the contact area of the ball 304 with the thread groove 305, making it possible to prevent the movement of the balls 304 toward the nut 303. Accordingly, in the case of normal operation (case where the screw shaft 302 works on the nut 303), the generation of heat due to three-point contact can be prevented.

Figure 25A:
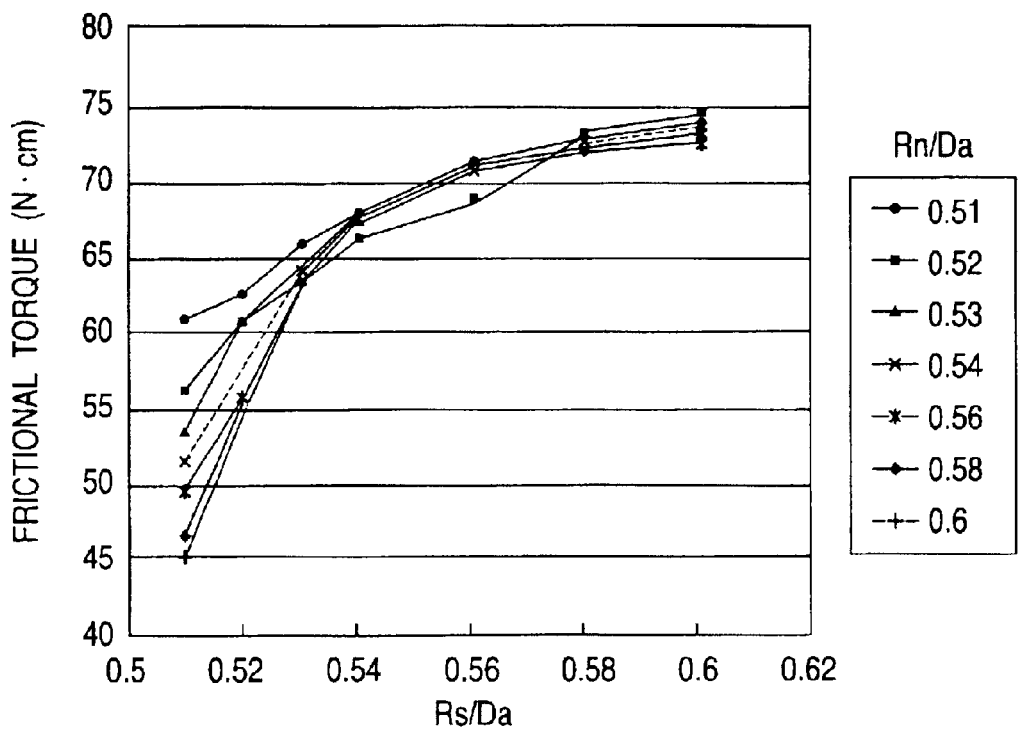
FIG. 25A illustrates the frictional torque characteristics in normal operation.

FIG. 25A shows the normal operational frictional torque (1,000 rpm) of the ball screw developed when fn is fixed to a range of from 0.51 to 0.6 and fs is varied from 0.51 to 0.6. In the case of normal operation, when the radius Rs of curvature of groove on the screw shaft side is generally reduced, the resulting friction is reduced. On the nut side, when the radius of curvature of groove is great, the resulting friction may be reduced. The change of friction is determined by the magnitude of the rolling viscosity resistance and the sliding friction due to three-point contact. As can be seen in the results of analysis of FIG. 25A, the minimization of the friction of ball screw can be effectively attained by satisfying the aforementioned relationship [3]. The denominator of the relationship [3] is the sum of fn and fs. Thus, the smaller the radii Rn, Rs of curvature of groove are, the greater is the value of the relationship. The numerator of the relationship [3] is the difference between fn and fs, which indicates how much small the radius of curvature of groove on the screw shaft side is as compared with that on the nut side. The relationship is multiplied by a constant of 0.4 to make adjustment.

Figure 26A:
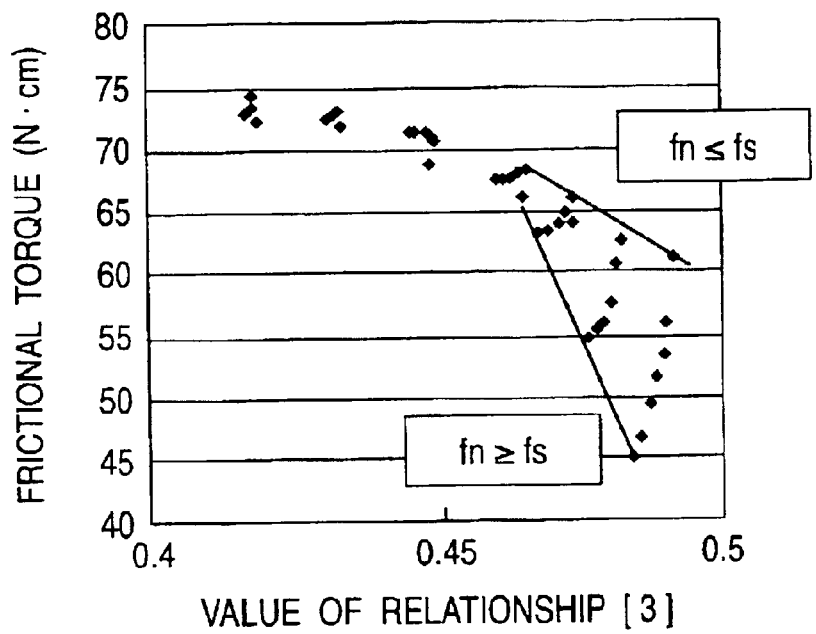
FIG. 26A illustrates the frictional torque characteristics in normal operation.
Figure 26B:
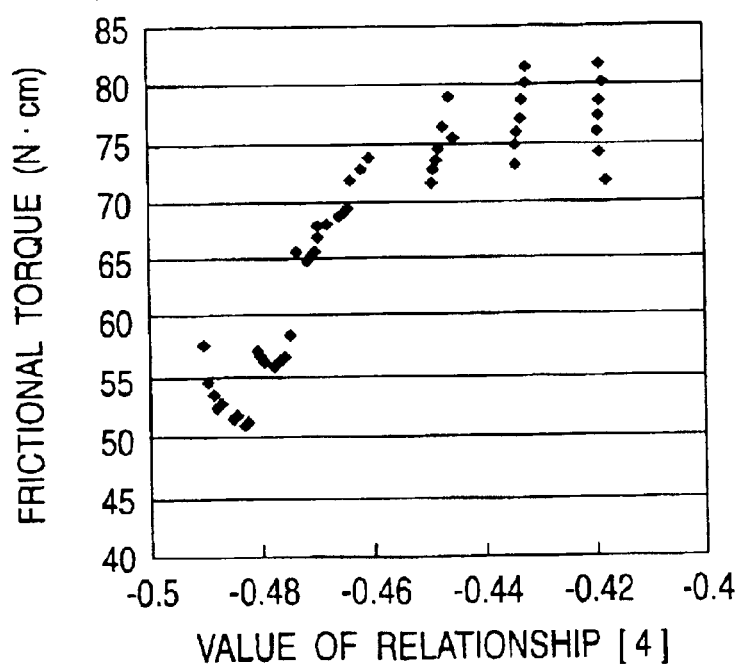
FIG. 26B illustrates the frictional torque characteristics in reverse operation.

As can be seen in FIG. 26A, when the value of the relationship [3] is not smaller than 0.46, a ball screw which is less subject to friction in normal operation can be obtained. For example, in the case of combination of fn of 0.58 and fs of 0.56, the value of the relationship [3] is 0.446, which falls outside the above defined range, and the frictional torque is 72 N·cm. For example, when fn and fs are 0.54 and 0.52, respectively, the value of the relationship [3] is 0.479, which falls within the above defined range, and the frictional torque is reduced to 58 N·cm.

Further, even when the radius of curvature of groove on the screw shaft side is greater than the radius of curvature of groove on the nut side as in the case where fn and fs are 0.52 and 0.53, respectively, the friction can be suppressed if the value of the relationship [3] falls within the above defined range. This predetermination is effective particularly when the life on the nut side is considered more important.

Figure 25B:
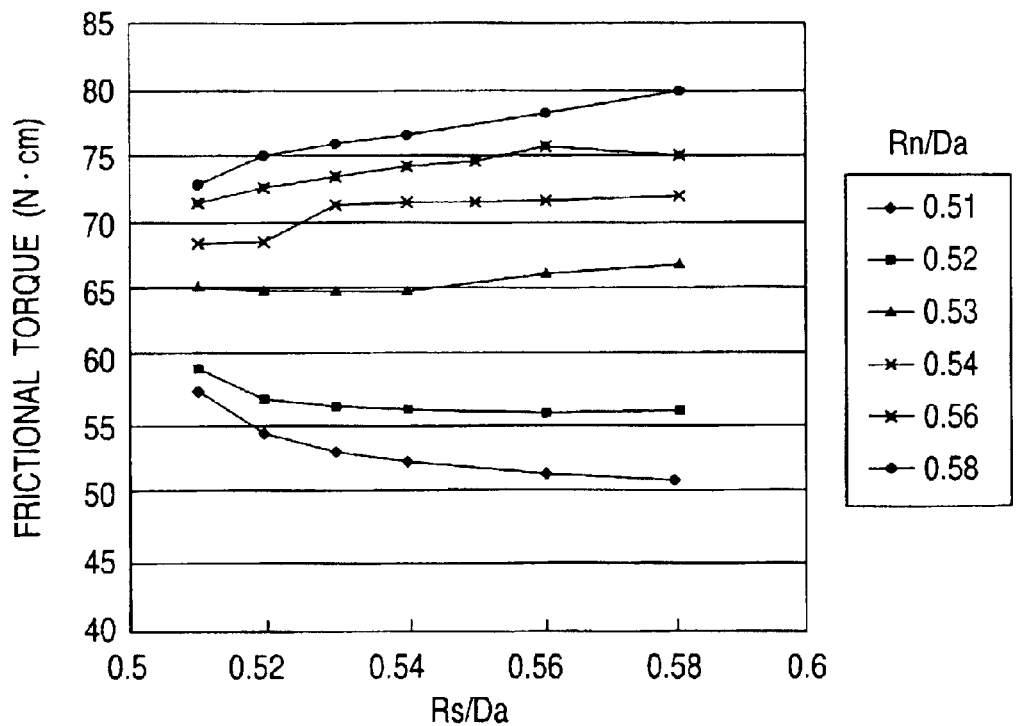
FIG. 25B illustrates the frictional torque characteristics in reverse operation.

FIG. 25B is an example of analysis illustrating the frictional torque (1,000 rpm) developed during reverse operation (when the nut 303 works on the screw shaft 302; when the direction of external load is the same as that of the movement of the nut). Theoretically speaking, the friction is reduced more when the radius of curvature of groove on the nut side is generally reduced.

An example of reverse operation is a restrictive use such as position detecting device in hydraulic machine. In such a use, when the relationship [4] is satisfied, the friction can be reduced.

In most uses, the ball screw is used not only in reverse operation but also in both reverse operation and normal operation in combination. Thus, only the relationship [3] may be satisfied. Further, in the case where a ball screw is used for a vertical shaft, a brake is needed to make the work stationary. Thus, in this case, the friction of the ball screw should be great to advantage. The frictional torque in reverse operation lowers the entire torque in reverse operation.

When the relationships [3] and [4] are satisfied at the same time, the friction can be suppressed to a relatively low value both in normal and reverse operations.

As mentioned above, in order to enhance the efficiency in normal operation, it is better to reduce the radius Rs of curvature of the thread groove 305. In order to enhance the efficiency in reverse operation, the radius Rn of curvature of the nut thread groove 306 may be reduced as shown in FIG. 24B.

Even when the radius Rs of curvature of the thread groove 305 is reduced taking into account the efficiency in normal operation, the friction during reverse operation doesn't increase. Similarly, even when the radius Rn of the nut thread groove 306 is reduced taking into account the efficiency in reverse operation, the friction during normal operation doesn't increase.

In other words, the efficiency can be enhanced more when the radius of curvature of groove on the driving side is reduced to increase the contact area with the ball 304.

The tenth embodiment of implementation of the invention will be described hereinafter in connection with the attached drawings. In the present embodiment, a columnar spacer 311 as a cushioning material is provided interposed balls 304. The parts having the same-action as those of the aforementioned embodiments are given the same reference numerals and signs as used in the aforementioned embodiments and their description will be omitted.

Figure 27A:
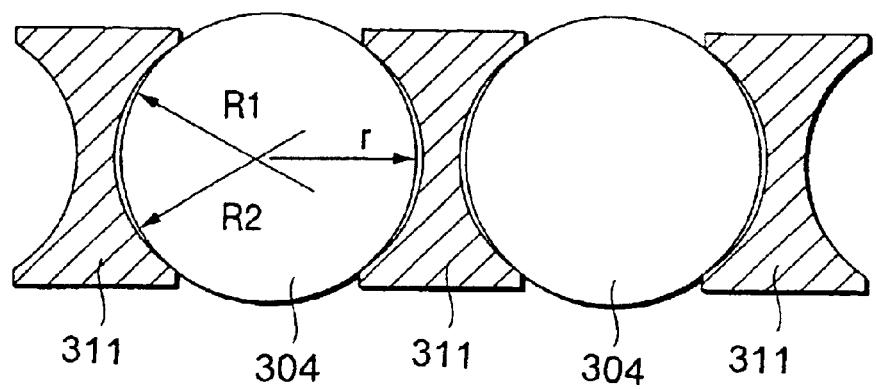
FIGS. 27A to 27C are sectional views of essential part illustrating the arrangement of a spacer according to the tenth embodiment.
Figure 27B:
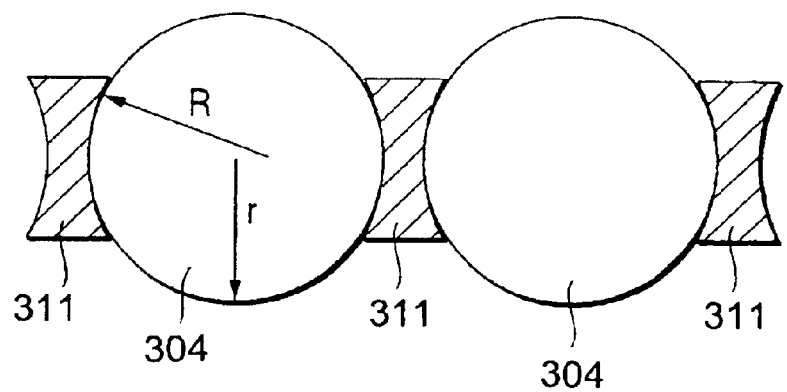
Figure 27C:
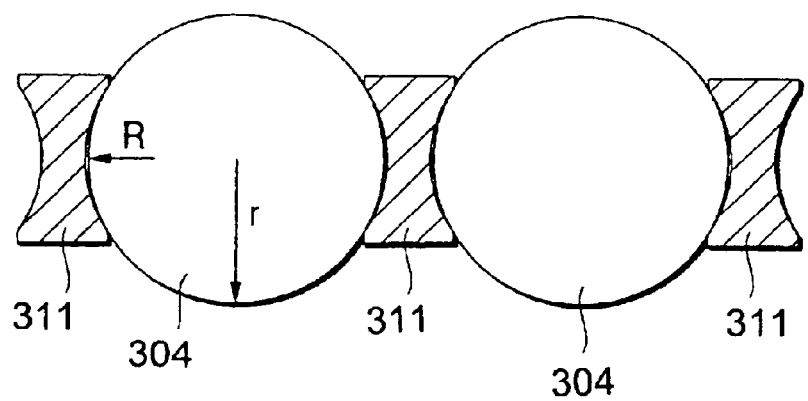

FIGS. 27A, 27B and 27C each are an enlarged sectional view of essential part illustrating the form of the spacer 311. These figures each diagrammatically illustrate the relationship between the ball 304 and the spacer 311 with the direction of movement of the ball 304 (screw shaft axis) positioned horizontal. The spacers 311 each have contact surfaces having a basically arc section formed thereon. Strictly speaking, these spacers have the following differences. These spacers 311 each are made of a self-lubricating material or a material which can contain a lubricant.

The spacer 311 shown in FIG. 27A has a Gothic arch surface having radii R1 and R2 which comes in contact with the ball 304. The radii R1 and R2 each are greater than the radius r of the ball 304. Accordingly, a gap is formed between the ball 304 and a part of the arch surface. The surface at which the ball 304 and the spacer 311 come in contact with each other is not necessarily required to be arc but may be straight line.

The spacer 311 shown in FIG. 27B has a single arch surface having a radius R. The radius R is predetermined to be greater than the radius r of the ball 304. In this arrangement, the ball 304 is retained by point contact.

The spacer 311 shown in FIG. 27C has a single arch surface having a radius R. The radius R is predetermined to be smaller than the radius r of the ball 304. In this arrangement, the ball 304 is retained by the annular edges of the spacer 311.

The seventh to ninth embodiments contemplate the minimization and stabilization of friction aiming at the reduction of friction between the track and the ball 304. However, as can be seen in FIG. 21, the variation of revolution speed is unavoidable. In the ninth embodiment, the spacer 311 is provided inter posed between the balls 304 to inhibit collision of balls 304, friction loss and torque variation.

As mentioned above, the linear-motion device of the invention comprises a separator comprising as a resin component a polybutylene naphthalate-based elastomer formed by a hard segment made of a polybutylene naphthalate and a soft segment made of a polycondensation of 2,6-naphthalenedicarboxylic acid with a polytetramethylene ether glycol. In this arrangement, the linear-motion device of the invention exhibits an enhanced grease resistance, causes reduced noise and has a prolonged life.

As mentioned above, the linear-motion device of the invention comprises a separator formed by a material having a flexural modulus of from 80 to 1,000 MPa. In this arrangement, the linear-motion device of the invention can be kept operated smoothly with little change of dynamic frictional force in the form of spike. The linear-motion device of the invention also is excellent in sound absorbing quality and assembly as well as in grease resistance and thus has a prolonged life.

As mentioned above, the ball screw of the invention allows balls to move smoothly through the entire portion where the balls move.

As mentioned above, the invention provides a low heat-generating high rigidity long-life ball screw which is less subject to rolling friction and generates less sliding heat due to three-point contact characteristic of precision ball screw and less friction heat due to variation of revolution speed.

What is claimed is:

1. A linear-motion device comprising:
   a linear-motion element fitted on a shaft which moves straight along the shaft;
   a plurality of balls which are retained in a ball groove formed on the inner side of the linear-motion element and roll over between the ball groove and the shaft;
   a separator interposed between the balls; and,
   a circulating path formed in the linear-motion element through which the balls are circulated from one end of the ball groove to the other, which is filled with a grease,
   wherein the separator is a formed product comprising as a resin component a polybutylene naphthalate-based elastomer formed by a hard segment made of a polybutylene naphthalate and a soft segment made of a polycondensation of 2,6-naphthalenedicarboxylic acid with a polytetramethylene ether glycol.

2. The linear-motion device as set forth in claim 1, wherein a concave surface of the separator for retaining the ball is roughened.

3. The linear-motion device as set forth in claim 1, wherein a concave surface of the separator for retaining the ball has a groove formed concentrically or spirally therein.

4. The linear-motion device as set forth in claim 1, wherein the separator is pierced with a hole extending from one concave surface thereof to another.

5. The linear-motion device as set forth in claim 1, wherein the surface hardness of the separator is from 45 to 75 on durometer D scale.

6. The linear-motion device as set forth in claim 1, wherein the filling grease is a grease comprising a mineral oil, poly-α-olefin oil or alkyldiphenylether oil as a base oil.

7. A linear-motion device comprising:
   a linear-motion element fitted on a shaft which makes a relative straight movement along the shaft;
   a plurality of balls which are retained in a ball groove formed on the inner side of the linear-motion element and roll over between the ball groove and the shaft;
   a separator provided interposed between the balls; and,
   a circulating path formed in the linear-motion element through which the balls are circulated from one end of the ball groove to the other and which is filled with a grease,
   wherein the separator is a formed product made of a material having a flexural modulus of from 80 to 1,000 MPa.

8. The linear-motion device as set forth in claim 7, wherein the separator is made of a thermoplastic elastomer comprising as a hard segment polyamide 12, polybutylene terephthalate or polybutylene naphthalate.

9. A ball screw comprising:
   a screw shaft having a spiral thread groove provided on the outer surface thereof;
   a nut having a thread groove provided on the inner surface thereof opposed to the thread groove of the screw shaft and engaged with the screw shaft with a large number of balls rollably mounted on a spiral ball rolling path formed by the two thread grooves; and,
   a ball circulating path fixed to the nut which catches the balls at one end of the ball rolling path and then feeds the balls to the other end of the ball rolling path,
   wherein the diameter of the thread groove of the nut gradually increases so that the constraint on the balls is gradually relaxed towards one end of the ball rolling path in the vicinity of the one end of the ball rolling path, and then the constraint on the balls is released at the one end of the ball rolling path, and the lead angle of the thread groove of the nut gradually changes so that the pilot pressure gradually decreases toward the one end of the ball rolling path, and then the pilot pressure is released at the one end of the ball rolling path.

10. The ball screw as set forth in claim 9, wherein the both ends of the ball circulating path are provided in at least one of the lead angle direction and the direction tangential to the ball rolling path at the both ends of the ball rolling path as viewed in the axial direction of the nut.

11. The ball screw as set forth in claim 9, wherein the nut has a flat surface parallel to the axis thereof provide on at least a part of the outer surface thereof, a pair of holes opened at the flat surface and communicating to the thread groove of the nut are provided, the ball circulating path is inserted in the holes on the flat surface at the both ends thereof so that it is fixed to the nut, and the portion the ball circulating path disposed on the flat surface outside the pair of holes is curved.

12. The ball screw as set forth in claim 9, wherein a spacer having a concave surface which makes sliding contact with a part of the surface of the balls or a spacer ball having a smaller diameter than that of the balls is provided interposed between the balls.

13. A ball screw comprising:
   a screw shaft having a spiral groove formed on the outer surface thereof;
   a nut having a spiral groove formed on the inner surface thereof; and,
   a plurality of balls disposed rollably in the space between the screw shaft and the nut,
   wherein the ratio of the diameter of ball (Da) to the pitch diameter (dm) satisfies the relationship [1] and the ratio of the pitch diameter (dm) to the diameter of the screw shaft (d) satisfies the relationship [2]:

$$0.05 < Da/dm < 0.2 \quad [1]$$

$$1.005 < dm/d < 1.06 \quad [2].$$

14. The ball screw as set forth in claim 13, wherein a cushioning material is provided interposed between the plurality of balls.

15. The ball screw as set forth in claim 13, wherein the plurality of balls each come in contact with the groove of the screw shaft and the groove of the nut at three points.

16. A ball screw comprising:

a screw shaft having a spiral groove formed on the outer surface thereof;

a nut having a spiral groove formed on the inner surface thereof; and, a plurality of balls disposed rollably in the space between the screw shaft and the nut, wherein supposing that the radius of curvature of the groove of the screw shaft is Rs, the radius of curvature of the groove of the nut is Rn, the diameter of ball is Da, fn is Rn/Da and fs is Rs/Da, at least one of the following relationships is satisfied:

$$0.44 \leq (0.4(fn-fs)+0.5)/(fn+fs) \leq 0.49 \quad [3]$$

$$-0.49 \leq (0.4(fn-fs)-0.5)/(fn+fs) \leq -0.44 \quad [4].$$

17. The ball screw as set forth in claim 16, wherein a cushioning material is provided interposed between the plurality of balls.

18. The ball screw as set forth claim 16, wherein the plurality of balls each come in contact with the groove the screw shaft and the groove of the nut at three points.

* * * * *